US012450575B1

(12) United States Patent
Sait et al.

(10) Patent No.: US 12,450,575 B1
(45) Date of Patent: \*Oct. 21, 2025

(54) WASTE BIN COLLECTION AND MONITORING METHOD USING WASTE BIN SENSORS

(71) Applicant: KING FAHD UNIVERSITY OF PETROLEUM AND MINERALS, Dhahran (SA)

(72) Inventors: Sadiq Sait, Dhahran (SA); Farouq Muhammad Aliyu, Dhahran (SA); Shuaibu Bukar, Dhahran (SA); Bashir Saleh Maina, Dhahran (SA); Dahiru Umar Lawal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/242,827

(22) Filed: Jun. 18, 2025

Related U.S. Application Data

(63) Continuation of application No. 18/314,331, filed on May 9, 2023.

(51) Int. Cl.
*G06Q 10/30* (2023.01)
*G01C 21/34* (2006.01)
(Continued)

(52) U.S. Cl.
CPC ......... *G06Q 10/30* (2013.01); *G01C 21/3453* (2013.01); *G01K 1/024* (2013.01);
(Continued)

(58) Field of Classification Search
None
See application file for complete search history.

(56) References Cited

U.S. PATENT DOCUMENTS 10,332,197 B2 * 6/2019 Kekalainen ............ G06Q 10/08
2014/0379588 A1 * 12/2014 Gates .................... G06T 7/0008
705/308
(Continued)

FOREIGN PATENT DOCUMENTS

EP            2923316 B1 *  6/2017  ............... B65F 1/14
GR       20210100018        9/2021

OTHER PUBLICATIONS

Saurabh Dugdhe, Efficient Waste Collection System, 2016 International Conference on Internet of Things and Applications (IOTA), IEEE (Year: 2016).*

(Continued)

*Primary Examiner* — Jerry O'Connor
*Assistant Examiner* — Matthew H Divelbiss
(74) *Attorney, Agent, or Firm* — Oblon, McClelland, Maier &Neustadt, L.L.P.

(57) ABSTRACT

A waste management method includes setting an allowable methane amount in a bin and an allowable waste amount in the bin. The method includes measuring a methane amount in the bin, a waste amount in the bin, a temperature in the bin and a humidity in the bin, transmitting the methane amount, the temperature and the humidity to a first network and transmitting the the waste amount, and the timestamp to a second network. The method includes generating a first time estimate with the first network and generating a second time estimate with the second network to determine whether the waste amount exceeds a predetermined allowable waste amount. The method includes generating a schedule and a route for a waste vehicle based on the first and second time estimates, a number of waste vehicles available, and methane emissions by the waste vehicles.

17 Claims, 17 Drawing Sheets

(51) Int. Cl.
*G01K 1/024* (2021.01)
*G01N 33/00* (2006.01)
*G06Q 10/0631* (2023.01)
*G07C 5/00* (2006.01)
*G07C 5/08* (2006.01)

(52) U.S. Cl.
CPC ... *G01N 33/0075* (2013.01); *G06Q 10/06316* (2013.01); *G07C 5/008* (2013.01); *G07C 5/08* (2013.01)

(56) References Cited

U.S. PATENT DOCUMENTS

| | | | |
|---|---|---|---|
| 2016/0300297 A1* | 10/2016 | Kekalainen | G06F 17/18 |
| 2018/0174115 A1 | 6/2018 | Rodoni | |
| 2019/0311333 A1* | 10/2019 | Kekalainen | H04W 4/38 |
| 2021/0188541 A1* | 6/2021 | Kurani | G06Q 10/08 |
| 2022/0051388 A1 | 2/2022 | Liu et al. | |
| 2022/0101280 A1 | 3/2022 | Anderson et al. | |

OTHER PUBLICATIONS

Munazir et al. ; Garbage Management System for Smart City using Lora Technology ; International Research Journal of Engineering and Technology, vol. 7, Issue 3 ; Mar. 2020 ; 4 Pages.

WILSEN.sonic.level ; IoT Sensor for Intelligent Fill Level Management ; pepperl-fuchs.com/pf-wilsen ; 2 Pages.

FLOCORP ; AccuTank Ultrasonic Level Monitoring System ; 2017 ; 7 Pages.

Saurabh Dugdhe, Efficient Waste Collection System, 2016 International Conference on Internet of Thing and Applications (IOTA), IEEE (Year: 2016).

* cited by examiner

WASTE BIN COLLECTION AND MONITORING METHOD USING WASTE BIN SENSORS

CROSS-REFERENCE TO RELATED APPLICATIONS

The present application is a Continuation of U.S. application Ser. No. 18/314,331, now allowed, having a filing date of May 9, 2023.

BACKGROUND

Technical Field

The present disclosure is directed to a waste management system and method, and particularly to an eco-friendly waste management system including artificial intelligence (AI).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Improper waste disposal can threaten the environment, due to excess methane emissions from decomposing waste. Currently, waste management companies deploy waste removal trucks that collect waste from waste bins that are full. The waste collection is performed periodically (daily, weekly or monthly). Increased frequency of waste collection leads to a cleaner environment, however, such collection leads to excessive fuel consumption and additional costs. In addition, such collection causes large carbon dioxide ($CO_2$) emissions from the engines of trucks collecting waste. Conversely, delaying waste collection causes methane ($CH_4$) emissions to accumulate from decay of waste that is left uncollected.

An IoT-based smart waste management system has been described. The system monitors a level of waste in city bins using ultrasonic sensors. Each bin sends the waste level to a server using Wireless Fidelity (Wi-Fi). The server uses artificial intelligence (AI) to predict waste levels in the future, then the server uses an optimization algorithm to find the shortest route to the full bins. The system is focused on the quick evacuation of waste from the environment. (See: G. K. Shyam, S. S. Manvi, and P. Bharti, "Smart waste management using Internet of Things (IoT). In 2017 2nd International Conference on Computing and Communications Technologies (ICCCT), pages 199-203, February 2017). However, the use of Wi-Fi within residential areas is not feasible since not all homes/buildings are equipped with Wi-Fi and installing the Wi-Fi infrastructure is an expensive venture.

U.S. Pat. No. 9,520,046 describes a refuse removal system including a base station and refuse bins. The base station includes sensors that monitor the presence or absence of the refuse in the bins from the base station. The base station notifies users before the arrival of a waste removal truck so that the users can bring the refuse bins for collection. This system focuses only on the notification to the users, and thus the system cannot adjust the schedule of waste removal trucks based on the rate of arrival of the refuse bins to the base station.

U.S. Pat. No. 9,927,278 describes a smart waste collection system that monitors a level of waste in a bin. The system includes temperature, humidity, and gas sensors. The gas sensors check for the level of methane. The system only notifies a waste management center, but does not adjust the schedule of waste removal trucks based on the rate of arrival of the refuse bins to the base station.

As such, none of the references describe a system that ensures the minimal emission of both $CO_2$ and $CH_4$. Accordingly, it is an object of the present disclosure to provide a waste management system and methods which overcomes the aforementioned limitations by limiting both methane emissions from waste bins and carbon dioxide emissions of waste removal trucks.

SUMMARY

In an exemplary embodiment, a waste management method is described. The method includes measuring, by a plurality of sensors located in each waste bin of a plurality of waste bins, a bin methane amount, a bin humidity, a bin waste level and a bin temperature; determining, by a location receiver located in each waste bin, a bin location of each waste bin; transmitting, by a sensor wireless communications transceiver of each of the plurality of sensors, the bin methane amount, the bin humidity, the bin waste level, the bin temperature and the bin location to a cloud server; receiving, by the cloud server, the bin methane amount, the bin waste level, the bin humidity, the bin temperature and the bin location from each of the plurality of sensors; recording, by the cloud server, a timestamp of the bin methane amount, the bin humidity, the bin waste level, the bin temperature and the bin location; transmitting, by the cloud server, the bin methane amount, the bin humidity and the bin temperature of each waste bin to a first processor; receiving, by the first processor, the bin methane amount, the bin humidity and the bin temperature of each waste bin and an allowable methane amount; transmitting, by the cloud server, the bin waste level and the bin location for each waste bin and the timestamp to a second processor; receiving, by the second processor, the bin waste level and the bin location of each waste bin, the timestamp and an allowable waste amount; generating, by the first processor, a first time estimate to reach the allowable methane amount based on the measured bin methane amounts and the temperature of the plurality of waste bins; transmitting, by the first processor, the first time estimate to a third processor; generating, with the second processor, a second time estimate to reach the allowable waste amount based on the measured bin waste levels of the plurality of waste bins; transmitting, by the second processor, the second time estimate to the third processor; measuring, by a carbon dioxide sensor located on each waste vehicle, an amount of carbon dioxide generated by each waste vehicle per unit time; determining, by a waste vehicle location sensor located on each waste vehicle, a location of the waste vehicle; determining, by a waste vehicle methane sensor located on each waste vehicle, an amount of methane emissions of the waste within each waste vehicle; transmitting, by a wireless transceiver of each waste vehicle, the amount of carbon dioxide, the location of the waste vehicle and the amount of methane emissions to the cloud server; transmitting, by the cloud server, the amount of carbon dioxide, the location of each waste vehicle and the amount of methane emissions of each waste vehicle to the third processor; receiving, by the third processor, the first time estimate, the second time estimate, the location of each waste bin, a set of parameters which determine the weighting of the first time estimate and the second time estimate, a number of waste vehicles available to empty the waste bins of waste, the amount of carbon dioxide generated by each waste vehicle per unit time, the location of each waste vehicle, and the amount of methane emissions of each waste vehicle; generating, with the third processor, a collection schedule and a waste vehicle route for each of the plurality of waste vehicles based on the first time estimate, the second time estimate, the location of each waste bin, the weighting of the first time estimate and the second time estimate, the number of waste vehicles available to empty the waste bins of waste, the amount of carbon dioxide generated by each waste vehicle per unit time, the location of each waste vehicle, and the amount of methane emissions of each waste vehicle; transmitting, by the cloud server, the collection schedule and the waste vehicle route to a database management system (DBMS); transmitting, by the DBMS, the collection schedule and the waste vehicle route to each waste vehicle; receiving, by the wireless transceiver of each waste vehicle, the collection schedule and the waste vehicle route; removing, by the plurality of waste vehicles each travelling on the respective waste vehicle route, the waste from the plurality of waste bins, and emptying the waste at a waste collection facility according to the collection schedule.

In some embodiments, the first processor is configured as a first artificial neural network (ANN).

In some embodiments, the first ANN is at least one selected from the group consisting of multi-layer perceptrons (MLP), recursive neural networks (RvNN), and recurrent neural networks (RNN).

In some embodiments, the second processor is configured as a second ANN, different from the first ANN.

In some embodiments, the second ANN is at least one selected from the group consisting of MLP, RvNN, and RNN.

In some embodiments, each of the sensors disposed inside each waste bin is an Internet of Things (IoT) sensor that can connect with other IoT sensors in neighboring waste bins to share sensor data through an IoT gateway.

In some embodiments, the waste vehicle further includes a microcontroller to keep track of activities of the waste vehicle and report the activities back to the database management system. The activities include location of the waste vehicle, distance from a waste collection facility, on-time performance, amount of waste load, and highway speed.

The total emissions of each waste vehicle in the urban setting ($C_{urban}$) are represented by the following formula:

$$C_{urban} = -611.662 + 1552.37\sqrt{x}$$

where $C_{urban}$ is measured in grams and x is a distance covered by the waste vehicle in kilometers.

The total emissions of each waste vehicle on the highway ($C_{highway}$) are represented by the following formula:

$$C_{highway} = -55482 + 16942.9\sqrt{x}$$

where $C_{highway}$ is measured in grams and x is a distance covered by the waste vehicle in kilometers.

The total emissions of each waste vehicle during trash collection ($C_{collection}$) is represented by the following formula:

$$C_{collection} = -350816 + 41757.3 \ln(t_{collect})$$

where $C_{collection}$ is measured in grams and $t_{collect}$ is a time it takes for waste collection in seconds.

The total emissions of each waste vehicle during trash collection ($C_{landfill}$) are represented by the following formula:

$$C_{landfill} = -236622 + 30058 \ln(t_{dump})$$

where $C_{landfill}$ is measured in grams and $t_{dump}$ is a time it takes for emptying waste into a waste collection facility in seconds.

In some embodiments, $t_{dump}$ further includes an idling time while the waste vehicles wait to empty waste into the waste collection facility.

In some embodiments, generating a schedule and a waste vehicle route for a waste vehicle employs a metaheuristic technique with the following least five inputs: a time for methane to reach an unacceptable level in the waste bins, the locations of the waste bins, a time for the bin to fill completely, a number of vehicles that can be dispatched, and an emission model for the waste vehicles.

In some embodiments, the schedule for the waste vehicle includes a predicted start time of collection and a predicted end time of emptying waste.

In some embodiments, each waste vehicle includes a waste vehicle wireless communications transceiver, a global positioning system (GPS), and a camera to monitor a status of the waste vehicles and report the status to the database management system.

In an exemplary embodiment, a system for waste management is described. The system includes a plurality of waste bins configured to hold waste, wherein each waste bin includes a plurality of waste bin sensors including at least a waste bin methane sensor configured to measure a bin methane amount, a waste bin level sensor configured to determine a waste amount in the waste bin, a waste bin humidity sensor configured to measure a waste bin humidity level inside the waste bin, a temperature sensor configured to measure a waste bin temperature inside the waste bin, and a waste bin location receiver, wherein each of the plurality of sensors includes a sensor wireless communications transceiver; a plurality of waste vehicles, wherein each waste vehicle is configured to collect the waste from at least one of the plurality of waste bins based on a collection schedule and a waste vehicle route; a waste vehicle methane sensor configured to measure a waste vehicle methane amount, a carbon dioxide sensor configured to measure a carbon dioxide level of the waste in the waste vehicle, a camera configured to record a status of the waste collection, a waste vehicle location receiver and a waste vehicle wireless transceiver located on each waste vehicle; a microcontroller located on each waste vehicle, wherein the microcontroller is connected to the waste vehicle methane sensor, the carbon dioxide sensor, the camera, the waste vehicle location receiver and the waste vehicle wireless transceiver; a cloud server configured to communicate bidirectionally with each waste vehicle wireless communications transceiver and each sensor wireless transceiver to receive and timestamp each bin methane amount, each bin waste amount, each waste bin humidity level, each temperature and the location of each bin, each waste vehicle methane amount, each carbon dioxide level of the waste in a waste vehicle, the status of each waste vehicle, and each waste vehicle location and transmit each bin methane amount, each bin waste amount, each waste bin humidity level, each temperature and the location of each bin, each waste vehicle methane amount, each carbon dioxide level of the waste in a waste vehicle, the status of each waste vehicle, each waste vehicle location and their respective timestamps to a database management system (DMBS); a cloud server memory configured to store an allowable bin methane amount, an allowable bin waste amount for each waste bin; a first processor, a second processor and a metaheuristics processor located within the cloud server, wherein the metaheuristics processor is connected to the first processor, the second processor and the DBMS; wherein the first processor is configured to receive the allowable bin methane amount, the allowable bin waste amount for each waste bin, each bin methane amount, each waste bin humidity level and each waste bin temperature, and generate a first time estimate to reach the allowable methane amount based on the measured bin methane amounts, waste bin humidity level and waste bin temperature of each of the plurality of waste bins; wherein the second processor is configured to receive the bin waste amount, the waste bin location, the timestamp and an allowable waste level of each waste bin and generate a second time estimate to reach the allowable waste amount based on the measured bin waste amounts of plurality of waste bins; wherein the metaheuristics processor is configured to receive the first time estimate, the second time estimate, the location of each waste bin, a set of parameters which determine the weighting of the first time estimate and the second time estimate, a number of waste vehicles available to empty the waste bins of waste, the amount of carbon dioxide generated by each waste vehicle per unit time, the location of each waste vehicle, and the amount of methane emissions of each waste vehicle and generate a collection schedule and a waste vehicle route for each of the plurality of waste vehicles based on the first time estimate, the second time estimate, the location of each waste bin, the weighting of the first time estimate and the second time estimate, the number of waste vehicles available to empty the waste bins of waste, the amount of carbon dioxide generated by each waste vehicle per unit time, the location of each waste vehicle, and the amount of methane emissions of each waste vehicle; wherein the metaheuristics processor is further configured to determine a total methane emission including a total amount of methane emissions of each of the available waste vehicles in an urban location, a total amount of emissions of each of the available waste vehicles on a highway location, and a total amount of emissions of each of the available waste vehicles during transfer of the waste to a waste collection facility and transmit the collection schedule and the waste vehicle route to the DBMS, wherein the DBMS is configured to transmit the collection schedule and waste vehicle route to each waste vehicle; and the waste vehicles are configured to remove the waste from the plurality of waste bins, travel on the waste vehicle route and empty the waste in a waste collection facility according to the collection schedule.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
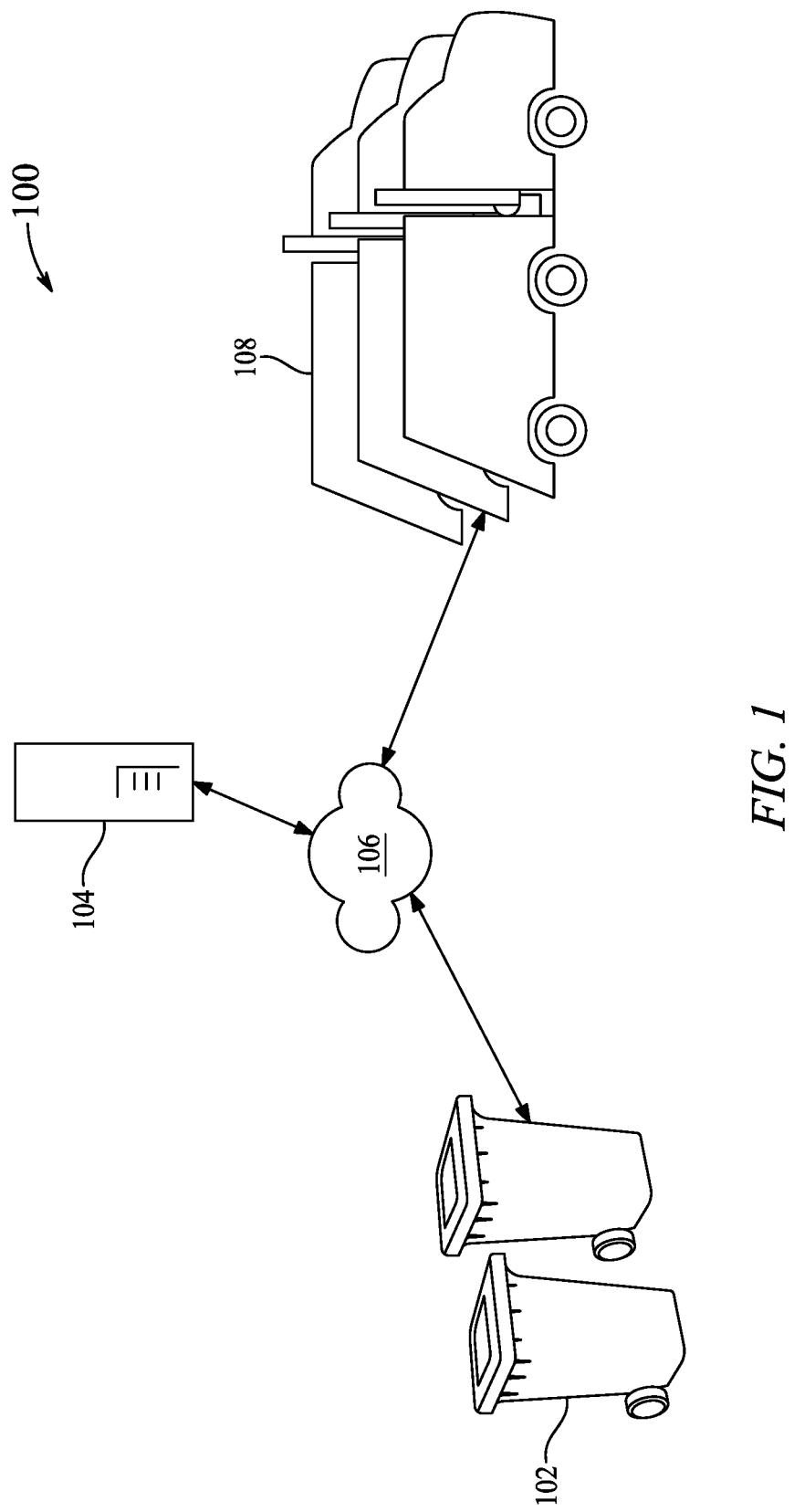
FIG. 1 illustrates a network diagram of a waste management system, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms refer to ranges that include the identified value within a margin of 20%, 10%, or preferably 5%, and any values there between.

Aspects of the present disclosure are directed to a waste management system and method. The waste management system includes a plurality of waste bin sensors equipped with wireless communications circuitry, such as Internet of Things (IoT) sensors, located in waste bins to sense a volume of waste and a volume of methane ($CH_4$) gas emissions and send the readings (sensed data) to a cloud server. The cloud server is configured to receive the sensed data and predict a collection schedule and a route to collect the waste from the waste bins for each of a plurality of waste vehicles. The waste bin sensors can be connected to the cloud through a variety of methods including 3G, 4G and 5G cellular, satellite, WiFi, near field communications, and low-power wide-area networks (LPWAN). Drivers of the waste vehicles receive the route from the cloud server which yields low fuel consumption and by extension low carbon-dioxide ($CO_2$) emissions which the server generates using artificial intelligence (AI) or machine learning (ML) techniques. Although the description herein refers to the detection of $CH_4$ and $CO_2$ gases, it may be understood that aspects of the present disclosure may also be directed toward detection of other gases such as carbon monoxide (CO), ammonia ($NH_3$), ethanol ($C_2H_5OH$), hydrogen ($H_2$), propane ($C_3H_8$), and isobutane ($C_4H_{10}$). The waste management system is scalable and inexpensive, thereby circumventing the drawbacks of the prior art.

In various aspects of the disclosure, non-limiting definitions of one or more terms that will be used in the document are provided below.

The term "microcontroller" as used herein refers to a computer component adapted to control a system to achieve certain desired goals and objectives. For example, the microcontroller may refer to, be part of, or include: an application specific integrated circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term "sensor" refers, without limitation, to the component or region of a device which is configured to detect the presence or absence of a measurable parameter. For example, the sensor may be a light sensor configured to detect the presence or absence of light, or a distance between objects detected using light reflected off one or both objects. The sensor may also be an ultrasonic sensor as a component in an ultrasonic transducer which includes both a unit of an ultrasonic actuator and the ultrasonic sensor, serving as a transmitter and a receiver, respectively, together in a pulse-echo ranging measurement method using ultrasonic waves.

The term "machine learning" refers to a method of data analysis that automates analytical model building. Machine learning is a branch of artificial intelligence (AI) that uses statistical techniques to give computer systems the ability to learn from data, without being explicitly programmed.

The term "metaheuristics" is a higher-level procedure designed to find, generate, tune, or select a partial search algorithm that may provide a sufficiently good solution to an optimization problem or a machine learning problem, especially with incomplete or imperfect information or limited computation capacity. Metaheuristics sample a subset of solutions which is otherwise too large to be completely enumerated or otherwise explored. Metaheuristics may make relatively few assumptions about the optimization problem being solved and so is usable for a variety of problems.

The term "methane" refers, without limitation, to a gas byproduct generated through the natural decomposition of solid waste. Methane may be referred to as $CH_4$.

Methane is odorless and a flammable gas. When present in high concentrations, it can be potentially explosive. Methane is nonreactive and not harmful to human health, but if there is excess methane production, suffocation can occur as methane displaces oxygen. The waste bin should be emptied immediately if the waste generates excessive methane gas.

FIG. 1 illustrates a network diagram of a waste management system 100 (hereinafter interchangeably referred to as "the system 100"), according to one or more aspects of the present disclosure. The system 100 includes a plurality of waste bins 102, a server (cloud server) 104, a cloud network 106, and a plurality of waste vehicles 108.

The system 100 is configured to manage collection of waste contained inside a plurality of waste bins 102 (otherwise referred to as the bins 102), placed at private, public, or commercial places. As shown in FIG. 1, one individual waste bin is labelled as the waste bin 102. As used herein, the term 'waste bins' refers to containers for storing waste for disposal. An individual waste bin may be referred to as 'the bin 102', unless otherwise specified. A number of the bins 102 collected by one waste vehicle of the waste management system 100 may lie in a range of 100 to 150 bins, more preferably 120-135 bins, or 125 bins. The bins 102 may be made out of metal, plastic, or any suitable material. The waste stored in the bins 102 may include, but are not limited to, garbage waste, recycling waste, organic waste, or chemical waste. In an aspect, the bins may include a set of wheels to make transport easier. The term "waste bin" may be used interchangeably with, without limitation, waste container, garbage bin, recycling bin, compost bin, dumpster or dust bin. The bin 102 may have a volumetric capacity of from 20 to 100 gallons, preferably from 30 to 90 gallons, preferably from 40 to 80 gallons, more preferably from 50 to 70 gallons, most preferably about 50 gallons.

A plurality of waste bin sensors are coupled to the bins 102. The bins 102 may be referred as "smart bins" as they include IoT sensors capable of collecting data regarding the bin, its contents and the immediate surrounding environment. Each bin 102 is configured to sense environmental data, such as location, temperature and humidity. Each bin 102 is further configured to record gas (such as methane gas) and the amount of waste inside the bin. The data collected by the sensors in the bin is then communicated, by a wireless communication device of each sensor, to a server stored in the cloud, or to a base station connected to the cloud server. In an aspect, the sensors may be installed inside a waste bin body. In another aspect, the sensors may be installed on an outer surface of the waste bin body. In yet another aspect, the sensors may be installed at any part of the waste bin body including the top or the bottom of a lid of the waste bin 102. The sensors installed outside the waste bin body may be used for detecting, quantifying, and monitoring the environment surrounding the waste bin 102. The sensors installed inside the bottom of the lid may be used for detecting, measuring, and monitoring a waste fill level and a gaseous emission of the waste inside the waste bin 102. In an aspect, a plurality of sensors may be installed to the waste bin body. The plurality of sensors may include, but are not limited to, a fill level sensor, a temperature sensor, a humidity sensor, a pressure sensor, an air quality sensor, a smoke sensor, a gas sensor, an ambient sensor, a motion sensor and a location sensor. The plurality of sensors may detect humidity, air quality, ambient light, RFID, motion, waste and litter type, tilt position, and waste weight of the bins 102. Each bin 102 contains from 2 to 10 sensors, preferably from 4 to 8 sensors. The sensors for the bins 102 detect the desired variables periodically on a consistent time scale, such as once a week, once a day, once every 12 hours, once every 8 hours, once every 4 hours, or once an hour. In an aspect, the sensors are camera or video sensors which can take photos or videos of the waste bin 102. The camera sensors can take from 1 photo/hour to 20 photos/hour, preferably from 5 photos/hour to 15 photos/hour, and most preferably 1 photo/day. In an aspect, some of the sensors are triggered by a time-based interval, the sensors including but not limited to, camera sensors, multispectral camera sensors, time of flight sensors, radar sensors, lidar sensors, and ultrasonic sensors.

In an aspect, a location sensor, is attached to each waste bin 102. The location sensor includes a global positioning system (GPS) receiver or a global system for mobile communications (GSM) receiver and/or cellular adapter elements. The working principle of the location sensor may be based on GPS and cellular network internet connectivity. GPS is a satellite-based navigation system that provides geolocation and time information to a GPS receiver anywhere on or near the Earth where there is an unobstructed line of sight to four or more GPS satellites. The GPS part of a location sensor is a receiver with antennas that use a satellite-based navigation system with a network of satellites in orbit around the earth to provide position, velocity, and timing information. A cellular adapter element of the location sensor enables cellular internet connectivity. In an aspect, the waste bin sensors disposed inside each bin 102 are Internet of Things (IoT) sensors that can connect with other IoT sensors in neighboring waste bins 102 to share sensor data.

At a basic level, Internet of Things refers to a system of interconnected devices that have sensors and embedded processing abilities. These interconnected devices do not have to use the Internet. These interconnected devices may interact and exchange data locally. In the IoT network, the data flow is mainly towards the cloud server, however, the data may be transmitted back and forth in cases where an actuation (control action) is required.

In the IoT network, as the IoT sensors have power constraints, they are designed for low power consumption; therefore, if they directly communicate with the cloud server, the power consumption will be high. In view of power savings, each of the IoT sensors communicates with the other IoT sensors first using short-range wireless transmission modes and networks such as ZigBee, near field communications, such as Bluetooth, etc., as they consume less power. In some cases, IoT sensors can be linked using long-distance technologies such as 3G, 4G and 5G LTE cellular, WiFi (when available), and such wireless communication technologies.

IoT sensors within a short range geographical area, such as the IoT sensors on the smart bin and neighboring smart bins, may elect a cluster head to gather and communicate the data. The cluster head may be chosen based on remaining battery life, that is, a sensor with a high battery charge may be designated a cluster head, collect the data from neighboring sensors, and transmit the data to the server.

In an aspect, each IoT sensor may include a GSM module that allows it to communicate with the server. GSM is a cellular communication system which operates in the United States in the 850 MHz band.

In an aspect of the present disclosure, each IoT device acts as its own base station. Each IoT sensor includes a microcontroller which collects data from the sensing unit, then uses a transceiver to send the data to the server.

In an aspect, each IoT sensor may be equipped with GSM SIM Card for internet access.

The microcontroller is also responsible for turning on and off the sensors and the transceiver for energy conservation. Each IoT sensor may include a small solar panel for energy harvesting to extend the battery life.

To save energy, the IoT sensors go to sleep, turning off all sensors and transceivers and wake up hourly to take measurements. If the data is different from the previous readings, it is transmitted to the server. Otherwise, it is discarded and the IoT sensor goes back to sleep until the next hour.

The sensors may allow identification of a plurality of waste bin attributes such as a waste bin unique device identifier (UDI), a name, a bin type, a content type, a bin photo, length, width, height, bin weight, volume capacity, a facility type, an installation date, current date and time, a radio frequency identification (RFID) tag, a geospatial position, a waste fill level, a temperature, a humidity, a pressure, an air quality index, a smoke level, a gas type, an ambient light level, a motion event, a tilt position, waste weight, a waste type, a biohazardous waste type, a biohazardous waste level, a pathogen type, a pathogen level, a waste amount and a gas emission.

In an aspect of the present disclosure, the IoT sensors measure a methane level in the bins 102. In an aspect, the IoT sensors measure the humidity and the temperature of the internal environment of each bin 102. The sensors send corresponding real-time data to a server 104 (also referred to as cloud server 104) of the waste management system 100 via a cloud network 106 through the wireless network. In some aspects of the present disclosure, the cloud network 106 may include other types of computer or telecommunication networks, such as a GSM network. The cloud network 106 connects different components of the waste management system 100 together. The cloud network 106 can involve deploying groups of remote servers and/or software networks that allow centralized data storage and online access to computer application software or resources. These groups of remote servers and/or software networks can be a collection of remote computing services. The cloud network may contain algorithms, methods, and databases. Smart waste bin sensor device data is sent to the cloud network 106, stored in a database for further processing and may be accessed by a waste bin mobile application or waste collection facility application. The cloud network 106 communicates to custom dashboards and control panels within the waste vehicles and allows for custom reporting and data download via a representational state transfer (REST) architecture which uses hypertext transfer protocol secure (HTTPS). The cloud network 106 also communicates through an application programming interface (API) and hypertext transfer protocol (HTTP) and interfaces with other APIs.

The server 104 may deploy groups of remote servers or software networks that allow centralized data storage and online access to computer application software or resources. Such groups may be a collection of remote computing services. The server 104 may include algorithms, methods, and databases. The server 104 may include one or more storage devices such as a hard disk drive (HDD), a solid-state drive (SSD), and a secure digital card (SDC); a processor; an input device such as a keyboard, a keypad, a cursor-control device, a touch screen, a camera, and a microphone; a display device such as a computer monitor, a flat-screen display, a projector and a display panel; an output device such as a printer and a speaker; and a memory. The memory may include random access memory (RAM) or similar types of memory. As used herein, the term 'RAM' refers to the short-term memory of a computer, where the data that the processor is currently using is stored.

The server 104 may further include a first network and a second network. The first and second networks include an artificial neural network (ANN) which can be selected from the group consisting of multi-layer perceptrons (MLP), recursive neural networks (RNN), and recurrent neural networks (RNN). In an aspect, the first and the second network are MLP. The memory includes a waste bin model including the plurality of waste bin attributes. The server 104 receives data from the bins 102 via the cloud network 106 and processes a schedule for a plurality of waste vehicles 108 of the waste management system 100. An individual waste vehicle is referred to as 'the waste vehicle 108', unless otherwise specified. As used herein, the term 'schedule' refers to the shortest distance traveled by the waste vehicle 108 for collecting waste from the plurality of waste bins 102 based on the fill level for each waste bin 102 and for emptying the waste at waste collection facility, such as a waste treatment facility and/or a landfill site.

The waste vehicles 108 are heavy trucks specially designed to collect solid and other waste and haul the collected waste to a waste treatment facility for recycling or deposit to a waste collection site, such as a landfill, waste recycling plant, waste sorting plant, and the like. The waste vehicles 108 may include, but are not limited to, a front loader, a rear loader, a side loader, a pneumatic loader, and a grapple truck. The waste vehicles 108 may run on fuel at least one selected from the group consisting of petrol, diesel, and compressed natural gas (CNG). In aspects of the present disclosure, the waste vehicles 108 are diesel-driven roll-off refuse/garbage trucks. The waste vehicles 108 receive the corresponding schedule from the server 104 and collect waste and transport the waste to the waste collection site. A mathematical model for waste vehicle emissions is used to schedule when and which waste vehicle 108 goes to collect the waste. In an aspect, waste vehicle 108 is a hydraulically actuated, front-loading type of waste vehicle. The waste vehicle 108 may be configured to onload (e.g., pickup), carry, offload (e.g., drop off), and/or empty commercial type dumpsters or trash bins (by way of a front-mounted lifting arrangement. In an aspect, the waste vehicle 108 is a flatbed or roll-off type of vehicle. The waste vehicle 108 may be configured to onload, carry, offload, and/or empty roll-off type dumpsters by way of a rear-mounted lifting arrangement. In an aspect, waste vehicle 108 is a residential type of vehicle. The waste vehicle 108 may be configured to onload, carry, offload, and/or empty household waste bins by way of a front-, rear-, and/or side-mounted lifting arrangement. The household waste bins may also be manually onloaded, offloaded, and/or emptied. The waste vehicles 108 include several other components not described herein but support in the accomplishment of the above-mentioned task.

Each waste vehicle 108 includes a camera to monitor the status of the waste vehicles 108 and report the status to a database management system (DBMS) stored in the server. As used herein, the term 'status' refers to the locations, availabilities, and waste-holding capacities of the waste vehicles 108. The waste holding capacities refer to the waste amounts which can be carried by the waste vehicles 108.

The waste vehicle 108 includes a microcontroller to keep track of the activities of the waste vehicle 108 and report the activities back to the DBMS. The activities include identifying a location of the waste vehicle 108, a distance from a waste treatment facility and/or a landfill, calculating on-time performance, the amount of the waste load, and the highway speed. The waste vehicles 108 may include a waste vehicle transceiver which includes a cellular mobile communications transceiver and/or a general packet radio service (GPRS) transmitter, and a global positioning system (GPS) which monitors the status of the waste vehicles 108 and reports the status to the DBMS.

General packet radio service (GPRS) is defined as a mobile communications standard that operates on 2G and 3G cellular networks to enable moderately high-speed data transfers using packet-based technologies.

In aspects of the present disclosure, the waste vehicles 108 may include an RFID, a radio tracking system, a near-field communication transmitter (NFC), geofencing, and internet tracking. The waste vehicles 108 may also include other satellite tracking systems.

A DBMS is a structured set of data held in a computer, especially one that is accessible in various ways. Database Management Systems (DBMS) are software systems used to store, retrieve, and run queries on data. A DBMS serves as an interface between an end-user and a database, allowing users to create, read, update, and delete data in the database. The DBMS manages the data, the database engine, and the database schema, allowing for data to be manipulated or extracted by users and other programs. This helps provide data security, data integrity, concurrency, and uniform data administration procedures. The DBMS optimizes the organization of data by following a database schema design technique called normalization, which splits a large table into smaller tables when any of its attributes have redundancy in values. The DBMS offer many benefits over traditional file systems, including flexibility and a more complex backup system. Database management systems can be classified based on a variety of criteria such as the data model, the database distribution, or user numbers. The most widely used types of DBMS software are relational, distributed, hierarchical, object-oriented, and network. A non-limiting example of a DBMS is MySQL, which is an open source SQL database management system distributed by Oracle. SQL stands for "structured query language". SQL is the most common standardized language used to access databases. SQL is defined by the ANSI/ISO SQL standard.

The DBMS may include a hypertext preprocessor (PHP) server. A script is a series of instructions to be executed on other programs or applications. There are two types of scripting languages, that is, ones intended for the server-side or the back-end and ones for the client-side or front-end. When a web server receives a script, it will process the request and output to a web browser in an HTML format. A web server database stores the information so other users can't access the data and source code. PHP is a server-side scripting language, that is a server executes the instructions in a script. The server then provides the data on request, channels the requests, and organizes the information in a database. Python, Ruby, ColdFusion, Java, and C++ are other examples of server-side scripting languages.

A relational database stores data in separate tables rather than putting all the data in one storeroom. The database structures are organized into physical files optimized for speed. This logical model, with objects such as databases, tables, views, rows, and columns, offers a flexible programming environment. Rules governing the relationships between different data fields, such as one-to-one, one-to-many, unique, required or optional, and "pointers" between different tables are defined. The database enforces these rules, to eliminate the instances of inconsistent, duplicate, orphan, out-of-date, or missing data.

User interfaces (UIs) allow data to be created, read, updated and deleted by authorized entities. The authorized entities may be a system administrator, a waste company representative, a waste vehicle driver, a waste bin owner, a government agency, and the like. The software computing environment allows for various operations associated with waste bin data. Waste bin data is held in a structured manner in the DBMS. The DBMS includes tables and records for waste bins, collection routes, collection vehicles, litter, pedestrians, waste collection facilities, system administration, external weather data, and the like. Predefined, agile models are created where extra attributes can be added to the existing models. The program logic allows waste bin data definition operations such as creating databases, files, groups, tables, views, and the like; data manipulation operations including creating, inserting, reading, updating, and deleting data from objects; data control operations such as grant, revoking, rollback, commit; and database maintenance operations such as backup, restore, and rebuild. The program logic is responsible for collecting the waste bin big data and performing standard database relational operations such as select, project, join, product, union, intersect, difference, divide, and the like.

The waste vehicles 108 also include a plurality of sensors. The plurality of sensors may or may not be the same types of sensors as the sensors used in the bins 102. Each waste vehicle 108 may include a display screen or indicator to notify a user or driver of the bin status. The display screen 221 may include, but is not limited to, one of a liquid crystal display (LCD), a light-emitting diode (LED), an organic light-emitting diode (OLED), and an active-matrix organic light-emitting diodes (AMOLED). The user or driver may receive visual signals such as change in light color of the display screen or a pattern of lights. In an aspect, words such as 'activation' or 'inactivation' may appear on the display screen to notify the user or driver. In yet another aspect, the user or driver may receive audio notifications through speakers, microphone, headsets, or any another equipment either implanted in the waste vehicle 108 or connected to a smart phone.

In an implementation of the present disclosure, the data received from the sensors may be transmitted to the server 104 and stored in the DBMS for further processing and be accessed by a waste bin application which may be used by the user or driver. As used herein, the term 'waste bin application' refers to a set of instructions or an application designed to run on computing devices such as a mobile device, a tablet, a laptop, a pager, a personal assistant, internet protocol adapter (iPad) or a smart watch, to set up predetermined values for allowable methane levels, the plurality of sensors, access the sensors data, the location of the waste bin, the type of waste vehicle 108, the schedule and the waste fill level.

Figure 2A:
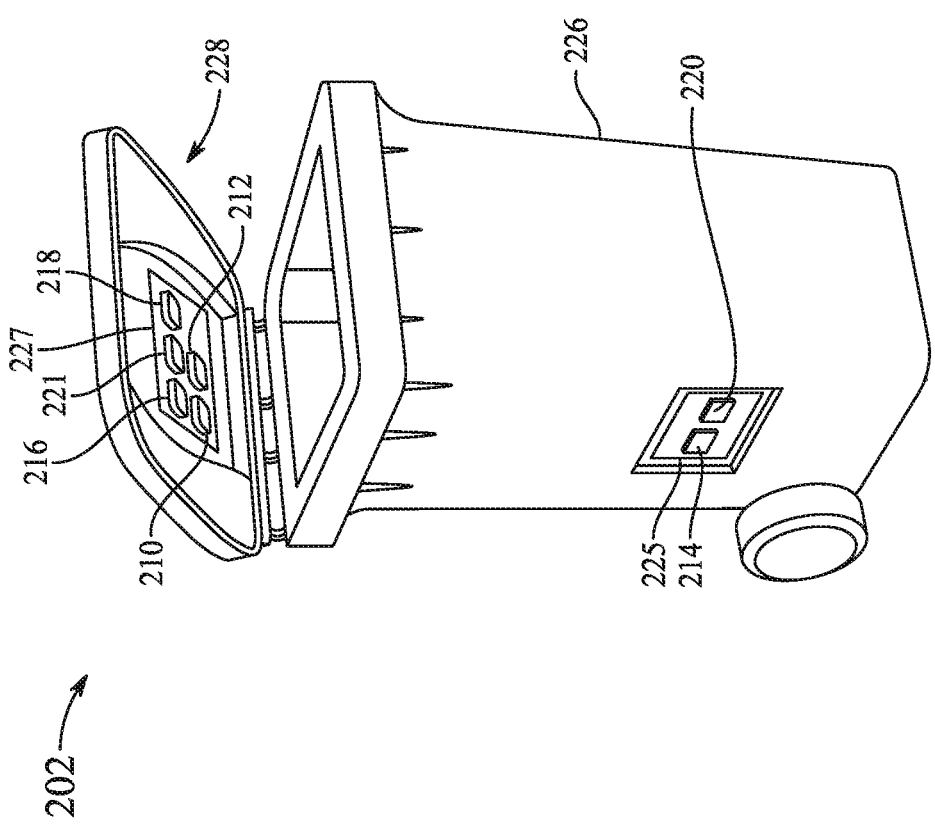
FIG. 2A illustrates an exemplary representation of a waste bin, according to certain embodiments of the present disclosure.

FIG. 2A illustrates an exemplary representation of a waste bin 202, according to certain embodiments. As shown in FIG. 2A, the waste bin 202 includes, inter alia, a waste bin housing 226, a lid 228, a waste bin display screen 221, and a plurality of sensors.

The waste bin housing 226 has an open end and a closed end. The open end is closed by the lid 228. For example, but not by way of limitation, the waste bin housing 226 of the waste bin 202 may be square, rectangular, oval, round, elliptical, triangular, hexagonal, or octagonal shapes, or any other polygonal shape, or any combination of such shapes. The waste bin housing 226 is made of material that is rust-free, non-rusting, corrosion-resistant, and/or acid-resistant. The waste bin housing 226 may be made of plastic, an insulating material, or metal, such as galvanized steel.

A plurality of waste bin sensors is coupled to the waste bin 202. In an aspect, the plurality of sensors includes at least a temperature sensor 210, a humidity sensor 212, a location sensor 214, a methane sensor 216, a level sensor 218, and other sensors 220. The location sensor may be a Global Positioning System (GPS) receiver or a Global System for Mobile Communications (GSM) receiver.

The waste bin methane sensor 216 is configured to measure the amount of methane gas inside the waste bin 202. The waste bin level sensor 218 is configured to measure bin waste amount in the waste bin 202. The waste bin methane sensor 216, the humidity sensor 212, the temperature sensor 210 and the waste bin level sensor 218 may be enclosed in a lid panel 227 located on the inside of the lid 228, which protects the sensors while allowing their sensing heads access to the interior of the bin 102. For example, the waste bin methane sensor 216 may be protected from the waste by a mesh screen. The waste bin level sensor 218 may be an ultrasonic sensor which may project ultrasonic waves towards the waste and receive the backscattered waves for measurement of the level of the waste. As such, the ultrasonic sensor may be enclosed by panel 227 and have a sensing head which projects through the panel to achieve the level measurement. In a non-limiting example, the waste bin level sensor 218 may be a Wilson sonic. level sensor, (See: "Intelligent Fill Level Management", manufactured by Pepperl+Fuchs Inc., 1600 Enterprise Parkway, Twinsburg, Ohio, United States). In a non-limiting example, the waste bin methane sensor 216 may be a RS-CH4-*-2 methane sensor, (See: "Methane Sensor", manufactured by Renke, High-Tech Zone, Jinan, Shandong, China).

The waste bin display 221 may be a series of lights, such as LEDs which light in a pattern or change color to indicate the fullness level and methane levels. Alternatively, the waste bin display may be a display screen, such as an LCD or LED display screen connected to a waste bin microcontroller, which displays messages. The messages may be "Bin Full", "Methane Level High", and the like.

The temperature sensor 210 is configured to measure the temperature of the contents within the waste bin 202. The humidity sensor 212 is configured to measure the humidity level of the interior of the waste bin 202. The waste bin location receiver 214 is configured to receive the location coordinates of the waste bin 202. The waste bin location sensor 214 may be enclosed in a side panel 225 located on the side of the waste bin. The side panel 225 may have an open end at its lower end, to allow airflow from the environment.

The other waste bin sensors 220 may include, but are not limited to, a pressure sensor, an air quality sensor, a smoke sensor, a gas sensor, an ambient sensor, and a motion sensor. The other sensors 220 may detect pressure, air quality, ambient light, RFID, motion, waste and litter type, tilt position, and waste weight of the waste bin 202, and may be located within either the lid panel 227 or the side panel 225 as necessary depending on the whether the contents of the bin 102 or the environment surrounding the bin 102 are to be sensed, respectively.

Each of the plurality of waste bin sensors is configured to transmit the sensed data to the cloud server.

The plurality of waste bin sensors is configured to generate a plurality of measurement signals (sensor data) by measuring a plurality of parameters associated with the waste bins. In some aspects, each of the plurality of sensors include a memory that is configured to store parameters or predefined settings required during resetting or rebooting of the plurality of sensors.

In some aspects, each waste bin 202 may include a wireless communications unit that provides connectivity between the waste bin 202 includes and the cloud server. The wireless communications unit may have at least one antenna for transmitting and receiving communications packets or records to/from the cloud server. In some examples, at least one antenna is a near field antenna, or a radio frequency antenna. The wireless communications unit may include a wireless frequency transceiver having a variable gain amplifier that generates radio-frequency signals for transmission. A wireless amplifier circuit may be used to amplify the radio-frequency signals at the output of the variable gain amplifier for transmission through a plurality of antennas. The wireless communications unit may be located within the side panel 225. In an aspect of the present disclosure, each of the plurality of sensors may connect, by near field communications, with the wireless communication unit. In another aspect of the present disclosure, each sensor may wirelessly communicate directly with the server using internal transmitters. In another aspect of the present disclosure, the IoT sensors may communicate directly with the server, and non-IoT sensors may be wired or connect by near field communication to the wireless communications unit to transmit their data.

In an aspect of the present disclosure, the wireless communications unit is disposed in a hinge connecting the lid 228 with the housing 226 of the waste bin 202 (FIG. 2A). In this location the transmitter is exposed to fewer physical and chemical interferences. For example, automated waste bin retrieval systems typically interact with the front and sides of the waste bin. Therefore, when waste is placed in a waste bin, the hinge area is generally protected. The hinges are preferably composed of a plurality of barrel hinges separately spaced along a back edge of the lid 228 and housing 226 of the waste bin. The barrel hinges share a common pin which passes axially through each hinge. The hinge pin may have a diameter of 0.5 cm to 5 cm and preferably is of a cylindrical tubing construction to accommodate electronics such as a transmitter therein. Sensors mounted in the lid panel 227 of the waste bin 202 may connect to the hinge pin via contact points in one or more hinge bodies to the hinge pin through conductive pathways deposited on the inner surface of the top 228 of the waste bin. In addition to the wireless communication unit disposed within the hinge pin, the hinge pin can further accommodate a power source such as one or more batteries.

Alternatively, each of the plurality of sensors may include an internal wireless communications transceiver and communicate directly with the cloud server. In this aspect, each internal wireless communications transceiver may include antennas and a microprocessor configured to communicate with the cloud server by LTE, 4G, 5G, or other communications protocol.

Figure 2B:
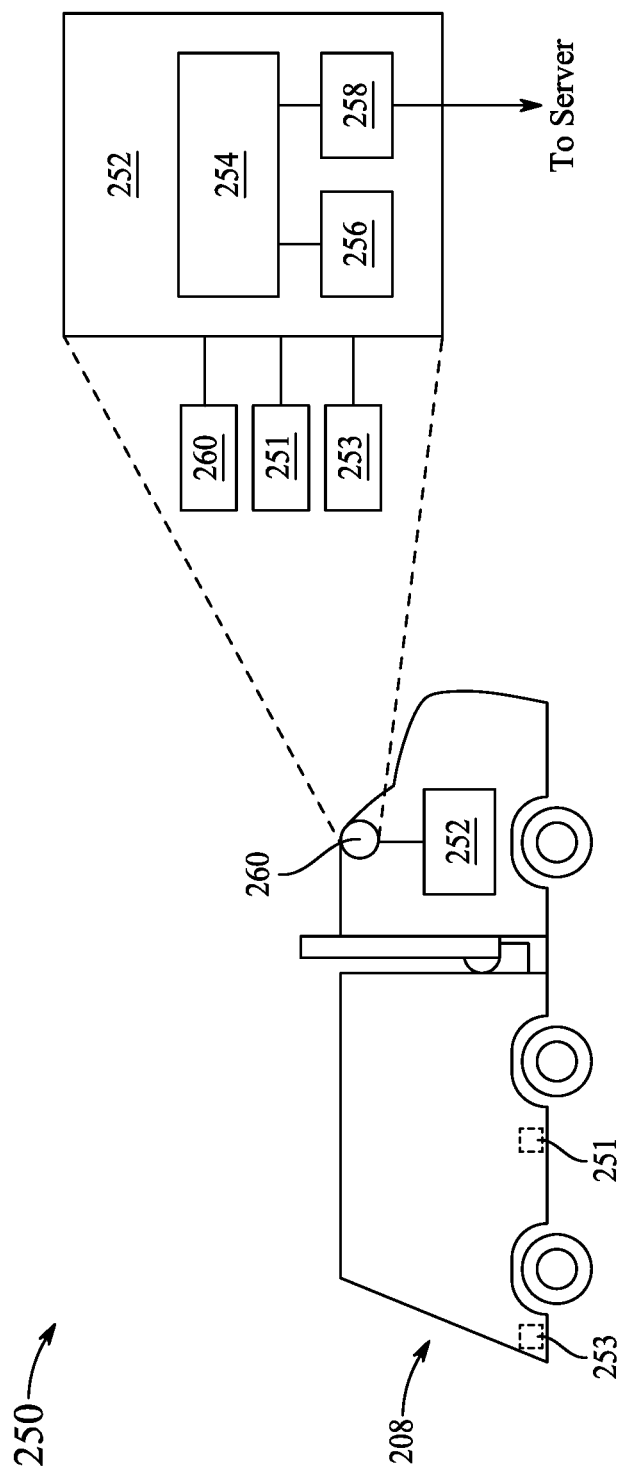
FIG. 2B illustrates an exemplary representation of a waste vehicle, according to certain embodiments of the present disclosure.

FIG. 2B illustrates an exemplary representation of a waste vehicle 208, according to certain embodiments. As shown in FIG. 2B, the waste vehicle 208 includes, inter alia, a waste vehicle wireless transceiver 252, a waste vehicle methane sensor 251 configured to measure a methane level inside of a waste holding area of the waste vehicle 208, a carbon dioxide sensor 253 located near an exhaust pipe of the waste vehicle 208, and a waste vehicle camera 260. The truck communication circuit 252 includes a microcontroller 254, and one or more of a location receiver 256 and a wireless communication transceiver 258, which includes one or more of a 4G transceiver, a 5G transceiver or a GPRS transceiver. The location receiver 256 may be one of a GPS receiver and a GSM receiver.

The waste vehicles 208 are trucks specially designed to collect waste from the plurality of waste bins 202. The waste vehicle 208 may include, but is not limited to, a front loader, a rear loader, a side loader, a pneumatic lifter, and a grapple truck. The waste vehicle 208 may run on fuel, at least one selected from the group consisting of gasoline, diesel, and compressed natural gas (CNG) or may be an electric vehicle. An electric waste vehicle may have a carbon footprint in that the generation of electricity to charge the rechargeable battery of the electric waste vehicle may be sourced from oil or coal burning power plants, which produce carbon dioxide emissions, which may be calculated as a function of the amount of electricity used by the vehicle.

The waste vehicle 208 is configured to receive a corresponding schedule for picking up waste from the waste bin 202 from the server 104. The waste vehicle 208 is configured to collect waste and transport the waste to the waste collection facility site.

The waste vehicle camera 260 is configured to monitor the status of the waste vehicles 208. As used herein, the term 'status' refers to the locations, availabilities, and waste-holding capacities of the waste vehicle 208. The waste holding capacities refer to the waste amounts that can be carried by the waste vehicle 208.

The truck communication circuit 252 is configured to track the activities of the waste vehicle 108 in real-time and report the activities back to the cloud server. The activities include identifying the location of the waste vehicle 108, the distance from a waste treatment facility and/or a landfill, calculating on-time performance, the amount of waste load, and a highway speed.

The microcontroller 254 in the waste vehicle is commutatively coupled to the waste vehicle location receiver 256, the wireless communication transceiver 258, and the waste vehicle camera 260 and is configured to receive the data from the waste vehicle location receiver 256, the waste vehicle wireless transceiver 258, and the waste vehicle camera 260 respectively. The waste vehicle camera 260 can take from 1 photo/hour to 20 photos/hour, preferably from 5 photos/hour to 15 photos/hour, and most preferably 10 photos/hour. In an aspect, some of the sensors are triggered by a time-based interval, including but not limited to, camera sensors, multispectral camera sensors, time of flight sensors, radar sensors, lidar sensors, and ultrasonic sensors. In an aspect, the waste vehicle camera 260 is configured to take a photo upon approaching a waste bin and take another photo after emptying the waste bin.

The microcontroller 254 is configured to execute a sequence of machine-readable instructions, which may be embodied in a program or software. The instructions may be stored in a memory location, such as a memory. The instructions can be directed to the microcontroller 254, which may subsequently program or otherwise be configured to implement the methods of the present disclosure. In some examples, the microcontroller 254 is configured to control and/or communicate with large databases, perform high-volume transaction processing, and generate reports from large databases.

The waste vehicle location receiver 256 is configured to receive the location coordinates of the waste vehicle 208. The waste vehicle location receiver 256 may be a global positioning system receiver (GPS) or a global system for mobile communications (GSM) receiver.

The waste vehicle wireless transceiver 258 is configured to enable the waste vehicle to transmit the data to the cloud server. The waste vehicle wireless transceiver 258 is used to enable the establishment of connections depending on internet protocols that support a wide variety of enterprises as well as commercial applications. The waste vehicle wireless transceiver 258 enables the sending and receiving of compact data bursts and large data volumes across mobile phone networks.

Figure 2C:
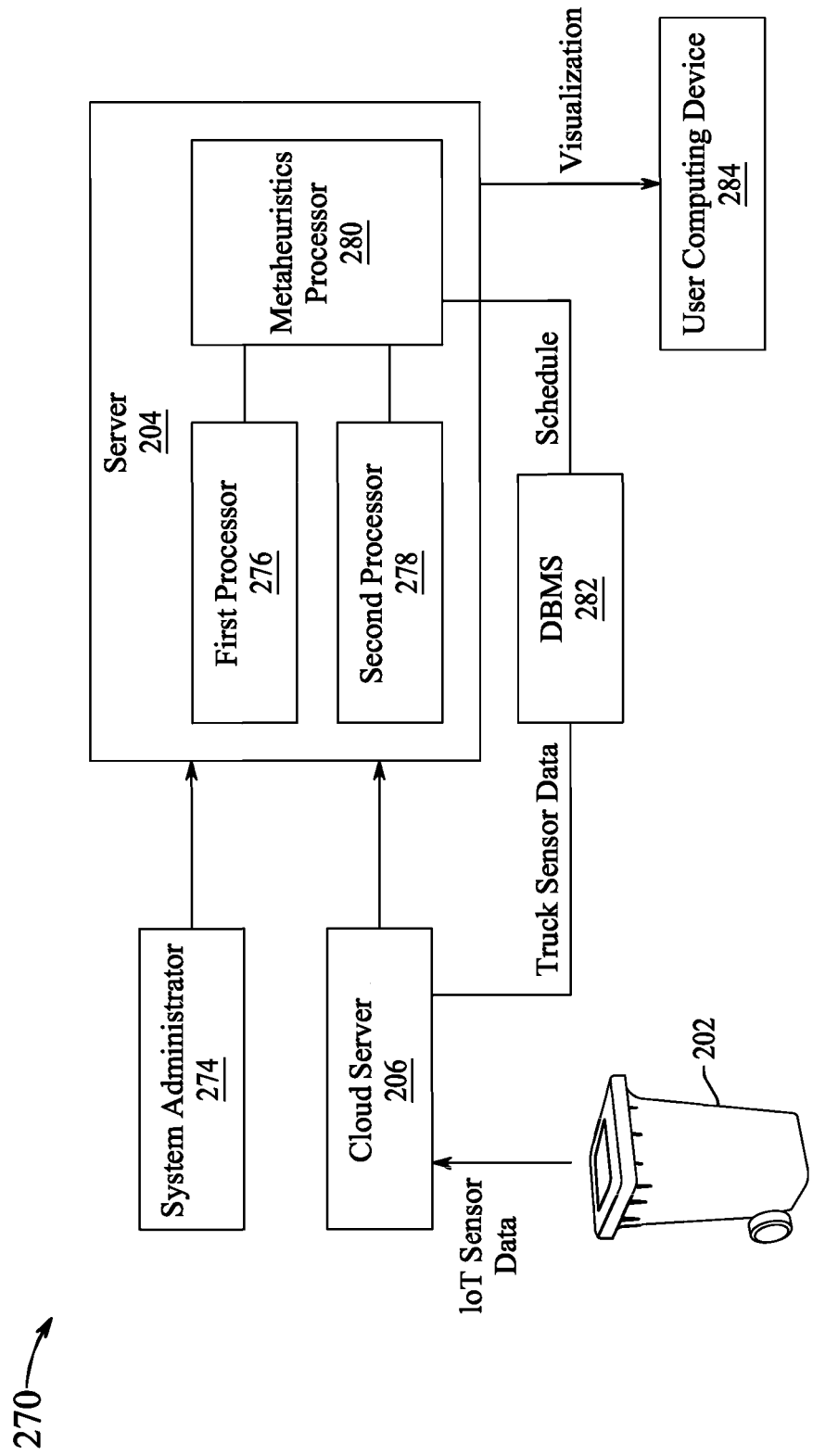
FIG. 2C is a schematic block diagram of the waste management system, according to certain embodiments of the present disclosure.

FIG. 2C is a schematic block diagram 270 of the waste management system 100. The waste management system includes a plurality of waste bins 202, a server 204, the cloud network 206, a system administrator 274, a DBMS 282, and a user computing device 284. The server includes a first processor 276, a second processor 278, and a metaheuristics processor 280. The DBMS 282 sends the waste vehicle sensor data (truck sensor data) to the cloud network 206. The DBMS 282 receives the schedule from the metaheuristics processor 280 and updates the schedule with the waste vehicle sensor data in order to incorporate waste vehicle availability into the schedule. The waste bin sensor data (IoT sensor data) is sent through the cloud 106 to the second processor 278. The system administrator 274 transmits reference parameters including a waste bin allowable amount and a waste bin allowable methane level for each waste bin 202 to the metaheuristics processor 280 through the server 204. Further details of the processing are described with respect to FIG. 3.

Figure 3:
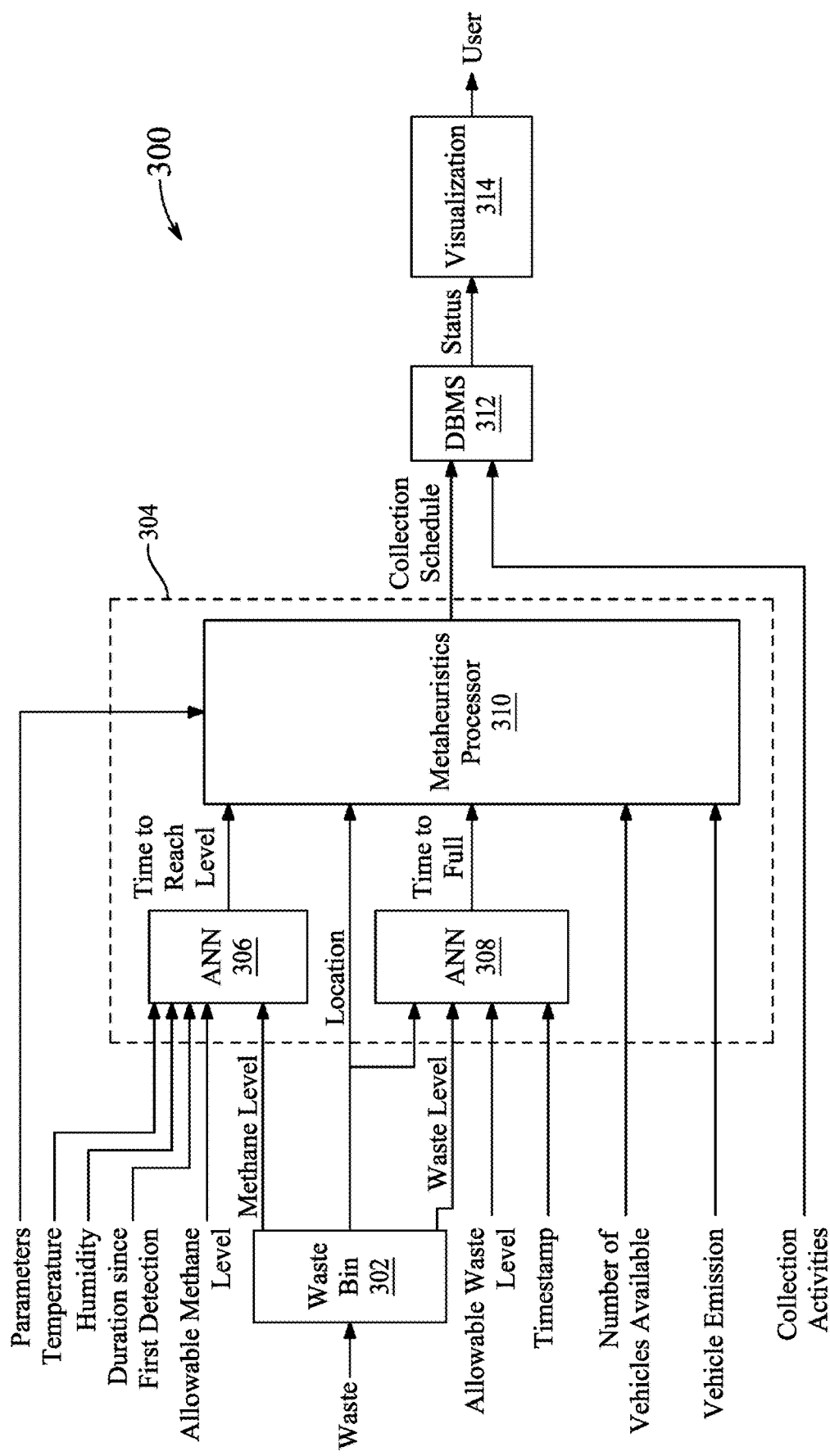
FIG. 3 is an exemplary flow chart of the waste management system, according to another embodiment of the present disclosure.

FIG. 3 is an exemplary flow chart of the waste management system 300. Referring to FIG. 3, the waste management system 300 includes a waste bin 302, an ANN 306 (referred to as the first processor 276 in the description of FIG. 2), an ANN 308 (referred to as the second processor 278 above), a metaheuristics processor 310, a DBMS 312 and a visualization tool 314. In an aspect, the ANN 306, the ANN 308, and the metaheuristics processor 310 are subblocks of the cloud server 104 (304) of FIG. 1.

The system administrator 274 inputs predetermined values for allowable methane, waste, and the type of a waste vehicle used in the waste collection. As the plurality of users put their waste in a plurality of bins, the level of waste and the amount of methane increases. This methane may escape the waste bins and pollute the surrounding environment. The methane level and the pre-programmed allowable methane level are fed to the ANN 306. The ANN 306 can be of any configuration, such as the multi-layer perceptron (MLP), the recursive neural network (RNN), and the recurrent neural networks (RNN). The ANN 306 predicts the time taken for the contents of a waste bin 302 to reach the allowable level of methane emission. Although FIG. 3 shows the waste bin 302 connected to the ANN 306, the ANN 308 and the metaheuristics processor 310, it should be understood that the connection is a wireless connection in which the data is transmitted to the ANN 306, the ANN 308 and the metaheuristics processor 310 through the cloud server 106 as described above.

The ANN 308 predicts the time taken for the waste bin 302 to fill with waste. The ANN 308 takes in an allowable waste level (or the size of the waste bin 302) given by the user, the waste level for the given bin from a level sensor in the waste bin 302, the location of the waste bin 302 as provided by the location receiver in the waste bin 302, and a timestamp of the sensing time. The ANN 308 then uses function approximation to predict the time for the waste bin 302 to fill with waste.

The metaheuristics processor 310 is used to schedule the time of dispatch and corresponding respective routes for waste vehicles. The metaheuristics processor 310 receives the following inputs for each waste bin 302: the time when methane reaches an unacceptable level, the location of the waste bin 302, the time when the waste bin 302 is full, the number of vehicles that can be dispatched, an emission model for the waste vehicles, and the reference parameters. The metaheuristics processor 310 then generates an output schedule which provides a set of routes equal to the number of the waste vehicles available. Each route has a beginning time and ending time that tells a driver when to start the collection and the possible time when the driver should finish.

As discussed with respect to FIG. 2B, each waste vehicle is equipped with a waste vehicle location receiver 256, such as a GPS or GSM receiver, at least one of a GPRS transmitter and a cellular network transceiver 258, and a camera 260. A microcontroller 254 on each waste vehicle keeps track of the activities of the waste vehicle and reports the same to the cloud server 206 through internet. Such activities, along with the schedule from the metaheuristics processor 310 are saved in the DBMS 312. The user, such as a waste bin owner, can use the user computing device 284 to view the status of the collection of his/her bin(s) through the visualization tool 314. Additionally, a system administrator 274 can log in as a user and visualize the status of the operations in the waste management company through the visualization tool 314. The system administrator 274 may be one of a community association officer, a waste collection company, a government waste bureau agent, a waste vehicle driver, the user, a responsible party, and the like. The system administrator can view the system directly from a workstation, while the drivers and users may view the system through a vehicle display, a smart phone, a tablet or a personal computer.

Figure 4:
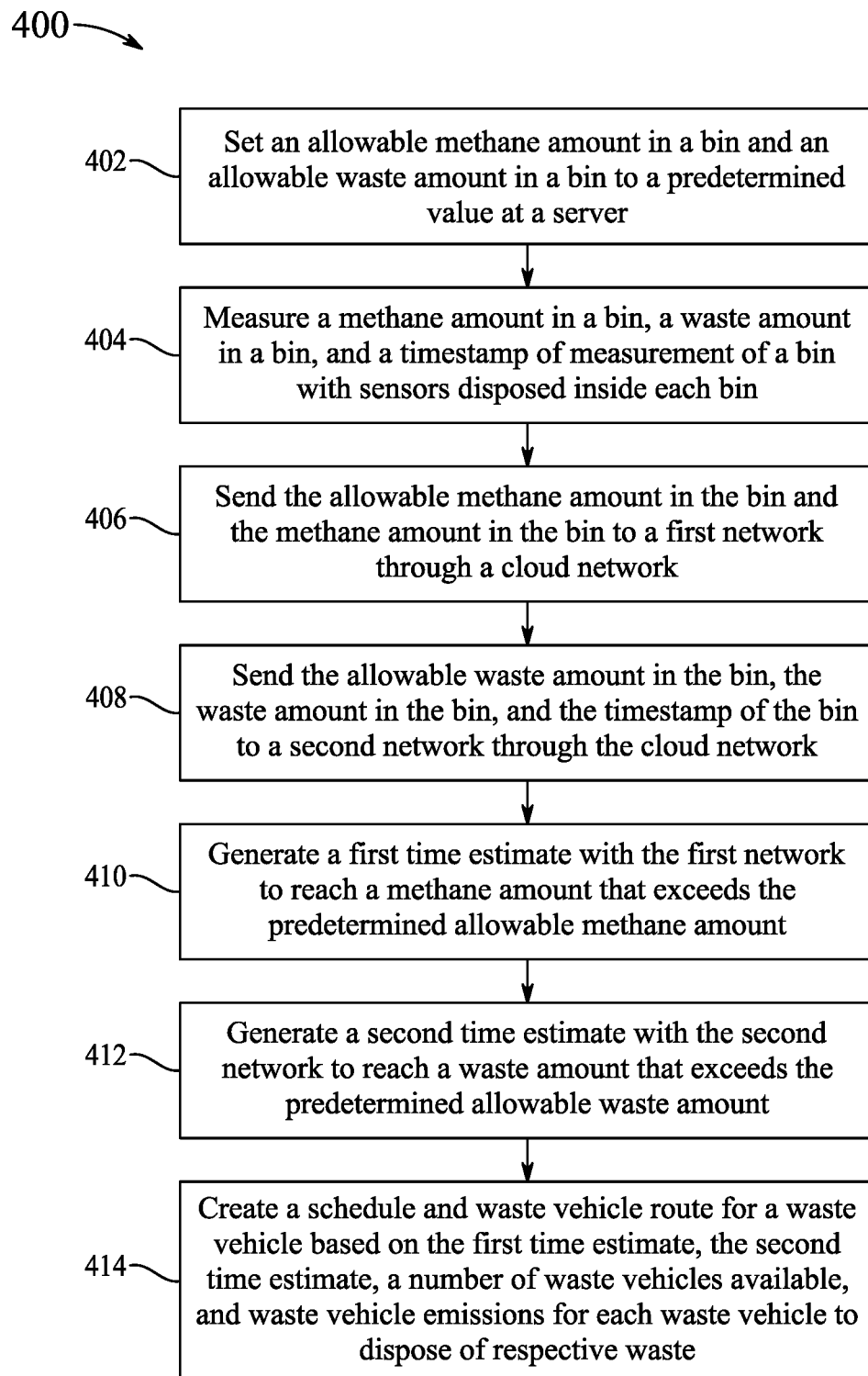
FIG. 4 is a schematic flow chart of the waste management method, according to certain embodiments of the present disclosure.

Referring to FIG. 4, a flow diagram of a waste management method 400 (otherwise referred to as the method) is illustrated. At step 402, the method 400 includes setting an allowable methane amount in the bin 102 and an allowable waste amount in the bin 102 to a predetermined value at the base station. An administrator of the system inputs predetermined values for the allowable methane amount, and waste amount via a waste bin mobile application. In an aspect, the allowable waste amount in the bin 102 may be determined on a volume basis, e.g., the amount of waste that occupies a volume of the bin 102. In an aspect, the predetermined value may be a waste level that is from 60 to 90% of the total volume of the bin 102, preferably from 70 to 80%, or 75%. In an aspect, the allowable methane amount in the bin may be determined by calculating a concentration (by mass, e.g., weight percentage) of the air in the bin 102. In an aspect, the allowable methane level is in a range consisting of 1 wt. % to 20 wt. %, preferably from 5 wt. % to 15 wt. %, most preferably 10 wt. % of the air present in the bin 102. In an aspect, the number of the bins 102 picked up by the truck is from 100 to 150 bins, preferably 110 to 140 bins, preferably 120 to 130 bins, preferably 125 bins. The allowable methane level may be variable depending on the neighborhood/type of property, the type of waste collection bin, and the volumetric capacity of the bin. In an aspect, the allowable methane level is a fixed amount. In an aspect, a system administrator sets an allowable level of carbon monoxide (CO), ammonia ($NH_3$), ethanol ($C_2H_5OH$), hydrogen (H), propane ($C_3H_8$), and isobutane ($C_4H_{10}$) in the bins 102. In an aspect, the bins 102 include a pressure sensor to monitor if the threshold level of methane has been reached. In an aspect, the cloud server is configured to set the predetermined level for each of the waste level and methane level at variable amounts dependent on the season. For instance, a waste level in the winter will have a lower methane threshold than a waste level in the summer. The landfill and waste bin methane and other gas emissions are strongly dependent on changes in barometric pressure. A rising barometric pressure suppresses the emission while a falling barometric pressure enhances the emission, a phenomenon called barometric pumping. Lower pressure will result in more gas seeping out from landfills and bins 102, and into the air, and the pressure sensors in the bins 102 can detect when the threshold methane level has been reached. As users put waste in the bin 102, the level of waste and the amount of methane (due to rot) increases. Methane is a gas byproduct generated through a natural decomposition of a solid waste. Methane is odorless and a flammable gas. Methane can be potentially explosive when present in high concentrations. The bin 102 should be emptied immediately if the waste is generating excessive methane gas.

At step 404, the method 400 includes measuring a methane amount in the bin 102, a waste amount in the bin 102, and a timestamp of the measurement of the bin 102 with the waste bin sensors disposed inside each bin 102. In an aspect, the sensors disposed inside each bin 102 may be IoT sensors that can connect with the other IoT sensors in the neighboring bins 102 to share the sensor data through the IoT gateway. In an aspect, the IoT sensors measure the carbon dioxide level in the bins 102. In an aspect, the IoT sensors measure the humidity and temperature of the environment surrounding the bins 102. In an aspect, the bin 102 contains camera sensors that can measure a timestamp of the bin 102. In an aspect, the IoT sensors are disposed within the bins 102 or on the outside of the bin in panel 227. In an aspect, the IoT sensors are disposed within the lid of the bin 102 in panel 225. In an aspect, the temperature, humidity, pressure, an air quality index, a smoke level, a gas type, an ambient light level, a motion event, a tilt position, waste weight, a waste type, a biohazardous waste type, a biohazardous waste level, a pathogen type, a pathogen level, a waste amount and a gas emission are measured by the IoT sensors within the bin 102 or on an outside surface of the bin. In an aspect, the bins include an LED display on an exterior of the bin 102 displaying a litter number. The litter number is based on an amount of waste in the waste bin 102, and which is reported in the range of 1 to 4, comprising: 1 (very low), 2 (low), 3 (medium), and 4 (high). In an aspect, the litter number of 1 comprises 0 to 10 vol. % of waste in the bin 102, preferably in the range from 2.5 to 7.5%, most preferably 5 vol. %, the litter number of 2 comprises 11 to 40 vol. % of waste in the bin 102, preferably in the range of 20 to 30 vol. %, most preferably 25 vol. %, the litter number 3 comprises from 41 to 70 vol. % of waste in the bin 102, preferably in the range from 50 to 60 vol. %, and most preferably 55 vol. %, and the litter number 4 comprises 71 to 99 vol. % of waste in the bin 102, preferably in the range from 80 to 90 vol. %, and most preferably 85 vol. %. In an aspect, the LED display on the exterior of the bin 102 also displays a methane number, based on a mass concentration of methane in the bin 102, and is reported in the range of 1 to 4, comprising: 1 (very low), 2 (low), 3 (medium), and 4 (high). The methane number of 1 comprises from 0 to 5 wt. % of methane in the bin 102, preferably 2.5 wt. %, the methane number of 2 comprises 6 to 15 wt. % of methane in the bin 102, preferably 10 wt. %, the methane number 3 comprises from 16 to 25 wt. % of methane in the bin 102, preferably 20 wt. %, and the methane number 4 comprises 26 to 40 wt. % of methane in the bin 102, preferably from 30 to 35 wt. %, most preferably 32.5 wt. %. The use of LED displays for both the methane and waste amounts in the bins 102 make it easier for the user to identify when the bins are reaching their waste or methane capacities, so the levels do not egregiously exceed the predetermined limit of methane or waste in the bin 102.

At step 406, the method 400 includes sending the allowable methane amount, the methane amount and humidity level of the bin 102 to the first network through the cloud network 106. In an aspect, the first network is at least one selected from the group consisting of a multi-layer perceptron (MLP), a recursive neural network (RNN), and a recurrent neural network (RNN). In an aspect, the first network is the artificial neural network (ANN). In an aspect, the first ANN network may use the sensory information to determine analytics which include, without limitation, bin fill history, location, pick up time, temperature, photos of bins, or contamination detection. The cloud network 106 communicates to custom dashboards, control panels, and allows for custom reporting and data download via a representational state transfer (REST) architecture which uses hypertext transfer protocol secure (HTTPS). The cloud network 106 also communicates through an application programming interface (API) and hypertext transfer protocol (HTTP) and interfaces with other APIs. In an aspect, the cloud network 106 also uses other external data sources such as scheduled sports, scheduled public events, current traffic, and weather when determining a route for collecting waste from a waste bin 102. In an aspect, the cloud network 106 includes a cloud sever memory. The cloud server memory includes a waste bin model that includes a set of waste bin attributes. The set of waste bin attributes includes a waste bin UDI, a name, a bin type, a content type, a bin photo, a length, a width, a height, a bin weight, a volume capacity, a facility type, an installation date, a current date and time, an RFID tag, a geospatial position, an altitude, a waste fill level, a temperature, a humidity, a gas sensor type, a waste weight, a waste type, a litter type, a litter level, a biohazardous waste type, a biohazardous waste level, a pathogen type, a pathogen level, and other waste bin 102 characteristics. In an aspect, the first network ANN 306 includes algorithms, along with machine-learning, and can continually learn to recognize new waste objects like paper, containers, food scraps, cardboard boxes, litter, hazardous waste, and such, from different angles and in various ranges from the photos and videos taken by the camera sensors in the bin 102. It can also learn and predict when the bin 102 will be full. As the first network ANN 306 is trained over time, the prediction becomes more accurate, thereby increasing the waste collection operational efficiency and reducing the cost to pick up waste.

At step 408, the method 400 includes communicating the allowable waste amount in the bin 102, the waste amount in the bin 102, and the timestamp of the bin 102 to the second network through the cloud network 106. In an aspect, the second network is at least one selected from the group consisting of the multi-layer perceptron (MLP), the recursive neural network (RNN), and the recurrent neural network (RNN). In an aspect, the second network is the second artificial neural network (ANN) 308. The cloud network 106 interacts with the second network the same way it interacts the first network, as described in step 406. The difference is that in step 406, the second network sends the waste amount and timestamp information to the cloud network 106 instead and the first network sends exclusively methane information to the cloud network 106.

At step 410, the method 400 includes generating a first time estimate with the first network to determine a methane amount that exceeds the predetermined allowable methane amount. The first time estimate can be defined as the amount of time it takes for the waste in the bin 102 to produce an amount of methane that exceeds the predetermined allowable methane amount. In an aspect, the LED display on the exterior of the bin 102 displays a timer. In an aspect, the timer counts down until the first time estimate expires and the waste can subsequently be collected when the timer strikes no time left. In an aspect, the timer displays the first time estimate in seconds, minutes, and hours. In an aspect, the timer displays the first time estimate in minutes and hours. In an aspect, when the counting down occurs, the color of the timer on the outside of the bin 102 is green, and once the timer expires, the color of the timer turns red, to display that the predetermined allowable methane amount has been reached. In an aspect, once the first time estimate is reached, an alarm or signal goes off on the GPS system in the waste vehicle 108 to alert the driver. In an aspect, the alarm or signal only goes off when the methane number is a 3 or 4.

At step 412, the method 400 includes generating a second time estimate with the second network to determine a waste amount that exceeds the predetermined allowable waste amount. Step 412 includes all the aspects of step 410 with the use of alarms and timers to notify users of the expiration of the second time estimate.

At step 414, the method 400 includes creating a schedule and a waste vehicle route for a waste vehicle based on the first time estimate, the second time estimate, a number of waste vehicles 108 available, and the waste vehicle emissions for each waste vehicle 108 to dispose of respective waste. In an aspect, creating a schedule and a waste vehicle route for a waste vehicle employs a metaheuristic technique with the following least five inputs: a time for methane to reach an unacceptable level in the bins 102, the locations of the bins 102, a time for each bin 102 to fill completely, a number of vehicles that can be dispatched, and an emission model for the waste vehicles 108. In an aspect, the schedule for the waste vehicle 108 includes a predicted start time of collection and a predicted end time of emptying waste. In an aspect, each waste vehicle 108 includes a sensor to compare the predicted end time to an actual end time in real time. In an aspect, the sensor in each waste vehicle 108 is an IoT sensor. In an aspect, the schedule and the waste vehicle route are sent to the DBMS to be stored and transmitted to a driver of the waste vehicle 108. The schedule provides a plurality of waste vehicle routes equal to the number of the waste vehicles 108 available. There is one defined waste vehicle route for each waste vehicle 108. In an aspect, each waste vehicle 108 includes a mobile cellular communications transceiver, the location receiver and the camera to monitor the status of the waste vehicles 108 and report the status to the DBMS. In an aspect, each waste vehicle 108 also includes a GPRS transceiver. In an aspect, the schedule includes a location for pickup, the type of waste in each bin 102, the distance from the waste vehicle location to the bin location, and other like variables. In an aspect, the schedule is a fixed schedule with fixed daily routes. In an aspect, the fixed schedule with fixed daily routes is adjusted every week. In an aspect, the fixed schedule with fixed daily routes is adjusted every month. In an aspect, the schedule is variable and has variable daily routes. The daily schedules and routes may be constantly adjusted on a daily basis depending on the waste and methane data generated from the sensors in the bins 102. For example, particular neighborhoods or regions where the methane levels exceed the predetermined amount at a faster rate than other neighborhoods or regions may be prioritized to be collected first in the daily schedule and daily route. Waste emissions of the waste vehicles should be minimized to limit gasoline or electricity consumption by limiting the distance between collection stops. This can be accomplished through the cloud network 106 to calculate the shortest distance between collection stops and an overall minimum distance travelled by each waste vehicle. In an aspect, the cloud network 106 employs a brute force algorithm to minimize the distance. In an aspect, the number of waste vehicles varies between urban regions suburban regions, and rural regions, and accordingly is an important variable when planning routes in each setting. In an aspect, the schedule/route is programmed into the location receiver of each waste vehicle 108.

The waste vehicle emissions include total emissions of each waste vehicle 108 in an urban setting, total emissions of each waste vehicle 108 on a highway, total emissions of each waste vehicle 108 during trash collection, and total emissions of each waste vehicle 108 during waste collection facility transfer. In an aspect, the total emissions of each waste vehicle 108 in the urban setting ($C_{urban}$) are represented by equation (1).

$$C_{urban} = -611.662 + 1552.37\sqrt{x} \qquad (1),$$

where $C_{urban}$ is measured in grams and x is a distance covered by the waste vehicle 108 in kilometers. The term, "urban", can be defined as a built-up area or agglomeration with human settlement at a high population density and a high infrastructure of built environment. Examples of urban areas include New York City, Washington D.C, Los Angeles, and other large cities.

In an aspect, the total emissions of each waste vehicle 108 on the highway ($C_{highway}$) is represented by equation (2).

$$C_{highway} = -55482 + 16942.9''\sqrt{x} \qquad (2),$$

where $C_{highway}$ is measured in grams and x is a distance covered by the waste vehicle 108 in kilometers. The term "highway" can refer to a main, public road that connects cities or towns. Examples include interstates, expressways, or arterial roads. The distance covered is an important parameter when predicting emissions for activities such as urban and highway mobility, which can be attributed to the variations in the acceleration of the waste vehicle. Therefore, during a regression model development, the total emission at each activity is modeled as a dependent variable, with distance (x) for the urban and highway activities modelled as independent variable.

In an aspect, the total emissions of each waste vehicle 108 during trash collection ($C_{collection}$) is represented by equation (3).

$$C_{collection} = -3.50815 + 41757.3 \ln(t_{collect}) \quad (3),$$

where $C_{collection}$ is measured in grams and $t_{collect}$ is a time it takes for waste collection in seconds. The term, "trash collection", can refer to the loading, collection, or picking up of waste/trash by the waste vehicles 108 while on their route or schedule.

In an aspect, the total emissions of each waste vehicle 108 during trash collection ($C_{landfill}$) is represented by equation (4).

$$C_{landfill} = -236622 + 30058 \ln(t_{dump}) \quad (4),$$

where $C_{landfill}$ is measured in grams and $t_{dump}$ is a time the waste vehicles 108 takes for emptying waste into a waste collection facility in seconds. The term, "waste collection facility" refers to the area/location where the trash collection is unloaded, dumped, or disposed of when the route is finished. The term $t_{dump}$ also includes an idling time while the waste vehicles 108 wait to dump waste into the waste collection facility. This idling time can include time to accommodate large influxes of waste vehicles 108 entering the waste collection facility at once, time to clean leakage/spillage of the waste that overflows from the waste vehicle 108, or extra time taken for the waste collection facility operators to ensure safe unloading (routine checks or maintenance required before dumping. An important parameter for activities such as the waste collection facility and trash collection is time, as the waste vehicle 108 idles during such activities and generates carbon dioxide emissions. Therefore, during the regression model development, the total emission at each activity is modeled as a dependent variable, with time (t) for the trash collection and waste collection facility activities modeled as independent variable.

The following examples describe and demonstrate exemplary embodiments of the waste management system 100 described herein. The examples are provided solely for the purpose of illustration and are not to be construed as limitations of the present disclosure, as many variations thereof are possible without departing from the spirit and scope of the present disclosure.

Example 1: Mathematical Models for Waste Vehicle Emissions

A statistical regression model for predicting total emissions from the waste vehicles was developed. Equations (1-4) represent the total emissions of the waste vehicle during different activities that are typically conducted during the waste collection such as pick up in the urban setting, travelling on the highway, trash collection, and time spent at a waste collection facility or a transfer station, respectively. The waste vehicle used in the experiments was a diesel powered waste vehicle.

Table 1 shows summary of models developed. The best model to represent a property variation was chosen based on the highest value of correlation coefficient value ($R^2$) and the adjusted correlation coefficient value ($R^2$(adj)), as well as the smallest standard error of estimate(S) of each developed model. P-values of each generated model were also used as a criterion for selecting the best model. Models with a small P-value are significant, especially, when the P-value is less the 0.05 (for 95% confidence level). Errors between the model predictions against the experimental data was found to be within 14% of the experimental findings.

TABLE 1

Summary of statistical regression model

| Activities | S | $R^2$ | $R^2$ (adj) |
|---|---|---|---|
| Urban | 2615.21 | 99.93% | 99.89% |
| Highway | 8875.7 | 91.15% | 86.72% |
| Trash collection | 4067.58 | 94.18% | 91.27% |
| Landfill or transfer station | 3015.2 | 88.10% | 82.15% |

Carbon dioxide contributed about 98.6% (on average) to the total emissions from the experimental data of the waste vehicle used in the regression modeling. Data for four refuse trucks were considered instead of six refuse trucks as presented in the literature, (See: Gurdas S. Sandhu, H. Christopher Frey, Shannon Bartelt-Hunt & Elizabeth Jones (2015), "In-use activity, fuel use, and emissions of heavy-duty diesel rolloff refuse trucks", Journal of the Air & Waste Management Association, 65:3, 306-323, DOI: 10.1080/10962247.2014.990587, incorporated herein by reference in its entirety), because of the large discrepancy in data between the ignored two refuse trucks and the used four refuse trucks. In an example, the four selected refuse trucks are: a diesel roll-off truck 2441 (2005 Mack Granite CV-713), a diesel roll-off truck 2442 (2006 Mack Granite CV-713), a diesel roll-off truck 2338 (2007 Mack Granite CV-713) and a diesel roll-off truck 2339 (2007 Mack Granite CV-713).

Example 2: Results and Discussions

Figure 5A:
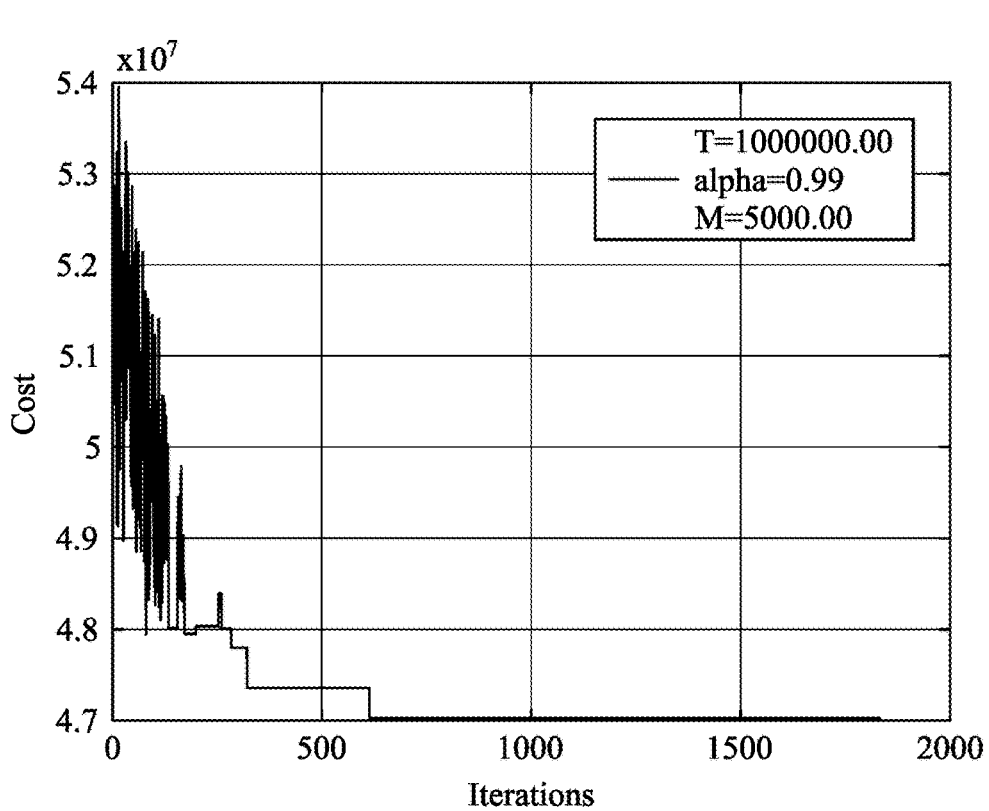
FIG. 5A is a graph depicting a cost estimate as the waste management system (with 100 waste bins) tries to find a path with least emissions, according to certain embodiments of the present disclosure.
Figure 5B:
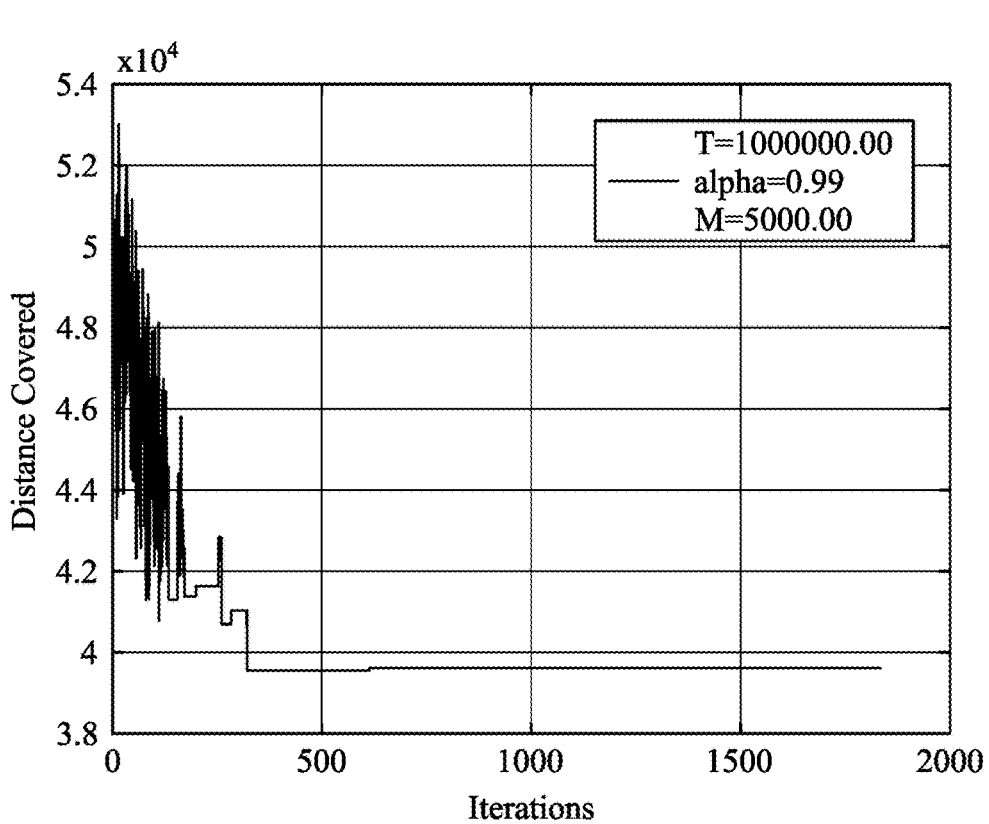
FIG. 5B is a graph depicting total distance covered by different routes (with 100 waste bins) as the system searches for a path with least emissions, according to certain embodiments of the present disclosure.
Figure 5C:
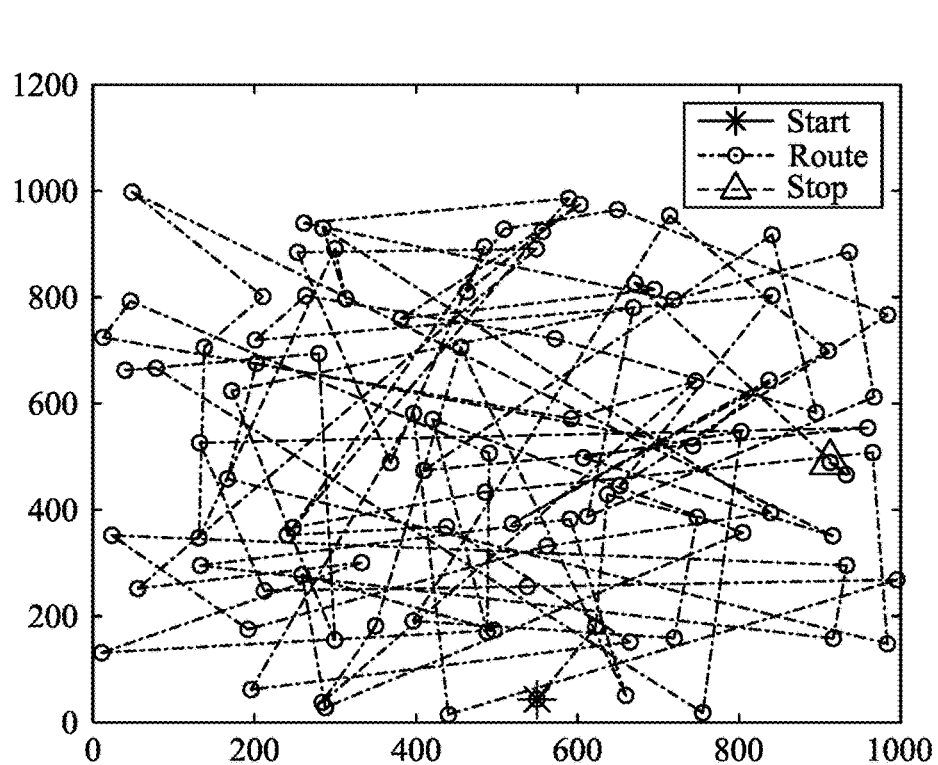
FIG. 5C is a graph depicting a scheduled path (with 100 waste bins) that is taken by a waste vehicle during waste collection, according to certain embodiments of the present disclosure.

Results in FIG. 5A-FIG. 5C illustrate the possible output of the waste management system 100 for one waste vehicle using simulated annealing for 2000 iterations.

Simulated annealing (SA) is a probabilistic technique for approximating the global optimum of a given function. In an example, the simulated annealing is a metaheuristic used to approximate global optimization in a large search space for an optimization problem.

Figure 5D:
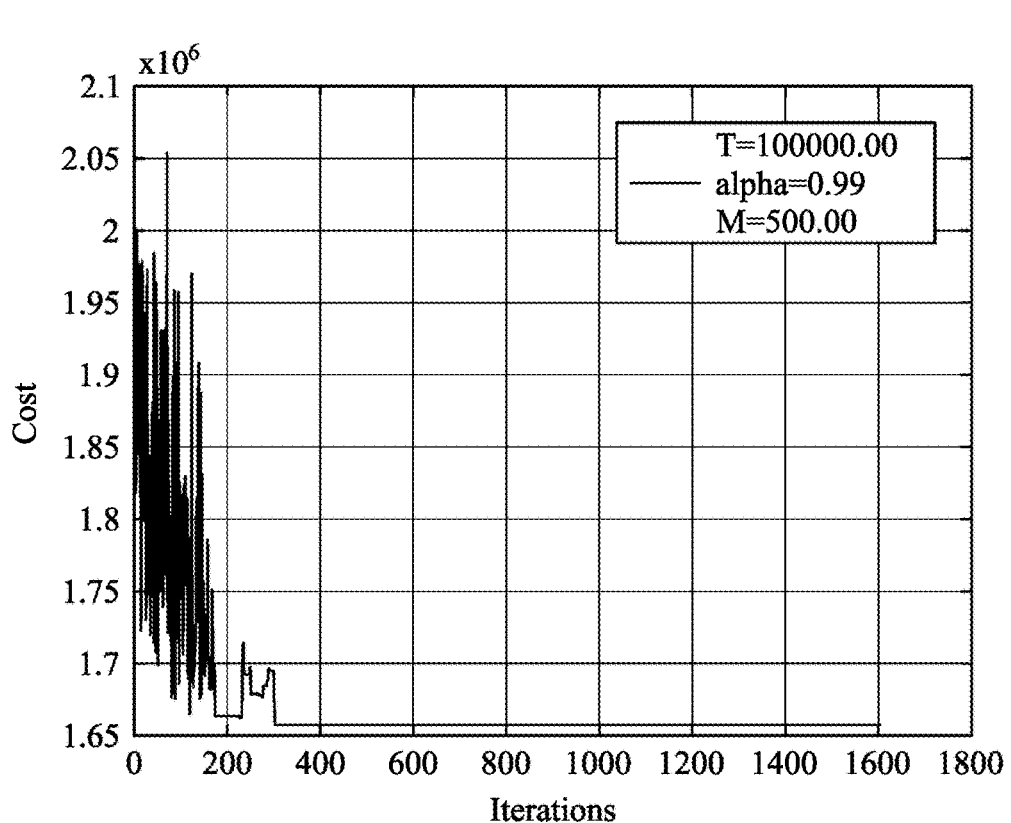
FIG. 5D is a graph depicting a cost estimate as the waste management system (with 10 waste bins) iterates the calculations to find a path with least emission, according to certain embodiments of the present disclosure.
Figure 5E:
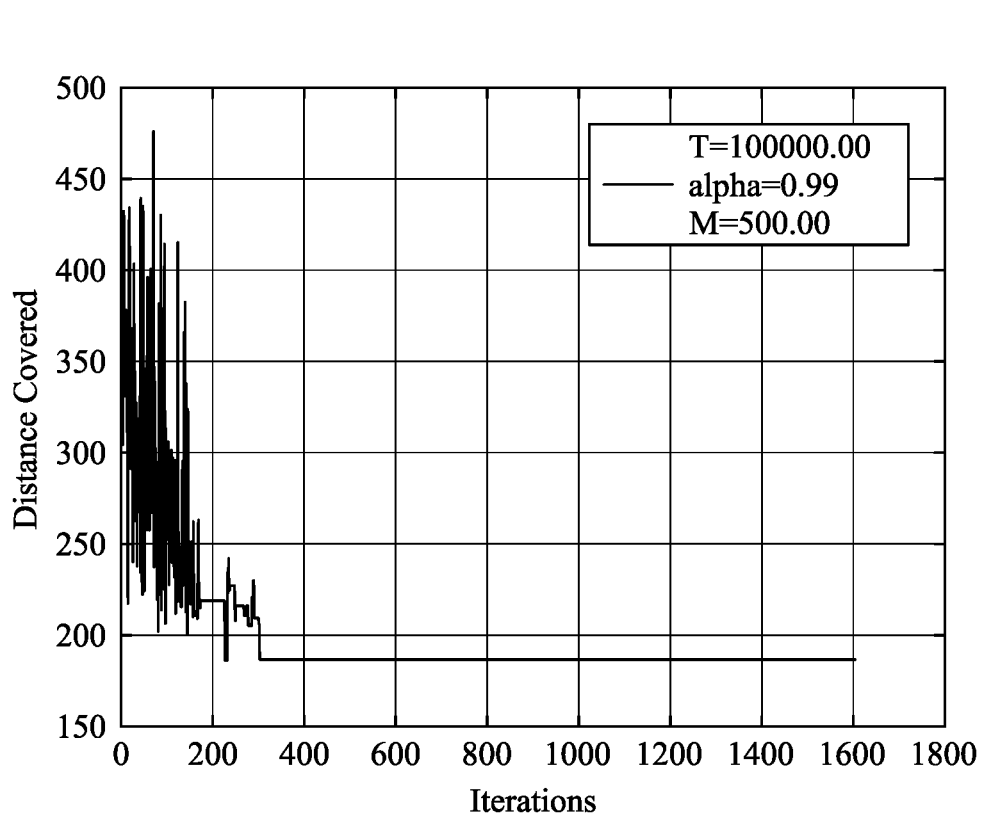
FIG. 5E is a graph depicting total distance covered by the different routes suggested by the waste management system (with 10 waste bins) as the system iterates the calculations to search for the path with the least emissions, according to certain embodiments of the present disclosure.
Figure 5F:
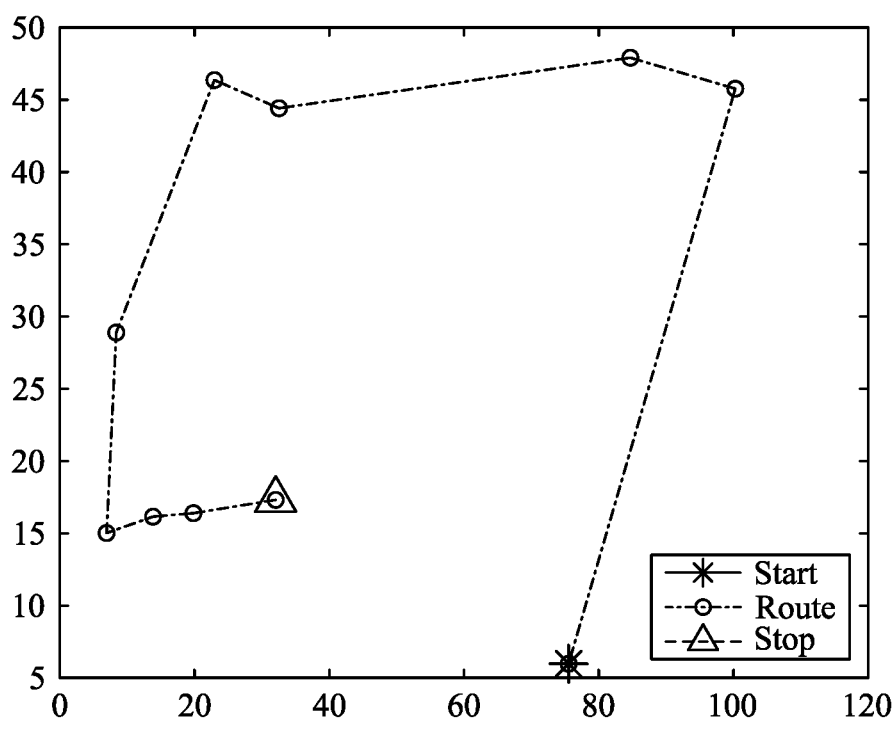
FIG. 5F is a graph depicting scheduled routes for 10 waste bins, according to certain embodiments of the present disclosure.

Several route schedules can be calculated depending on the number of the waste vehicles 108 used, then each schedule can be allocated to a waste vehicle. FIG. 5C and FIG. 5F show the cost estimate as the waste management system 100 tries to find a path with least carbon emissions. FIG. 5A and FIG. 5D show that for 100 and 10 bins, respectively, the cost estimates vary for up to 200-300 iterations and become almost constant after 400-500 iterations. FIG. 5B and FIG. 5E illustrate determining the total distance covered by different routes suggested by the waste management system 100 as the system 100 searches for the path with least emissions. For 100 and 10 bins, respectively, the total distances covered vary up to 300 iterations, however, the total distances covered become almost constant after 350-400 iterations. There is some correlation between using emissions and using distance for the cost estimation. However, using carbon emissions guarantees that emission is kept to a minimum regardless of the distance of the route taken. For example, a route with traffic hold ups may lead to more carbon emissions, such as carbon dioxide, compared to a route with no hold ups, even if the latter is longer.

The results show that machine learning can be used in calculating the route with minimum carbon emissions. FIG. 5C and FIG. 5F show scheduled paths that are taken by the waste vehicle during waste collection. FIG. 5C shows a plurality of paths which can be taken, and FIG. 5F shows the most efficient path for a specific waste vehicle to take. The path can be shown on a map of the waste vehicle to aid the driver.

Figure 5G:
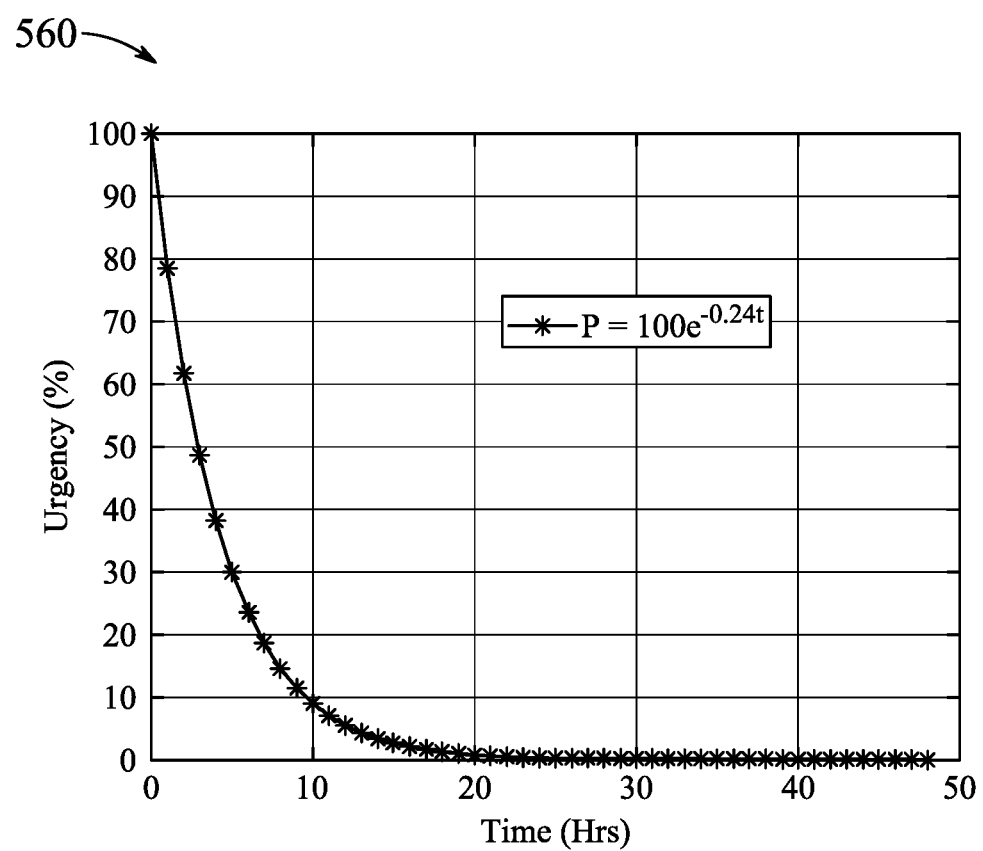
FIG. 5G illustrates the need (Urgency) to empty a waste bin over time to prevent methane emissions, according to certain embodiments of the present disclosure.

FIG. 5G illustrates the percent need (urgency) to empty a waste bin against time remaining until methane emissions exceed acceptable limits. FIG. 5G illustrates that the shorter the time to reach unacceptable emission levels, the (exponentially) higher the urgency is to collect the waste in the bin.

Figure 6:
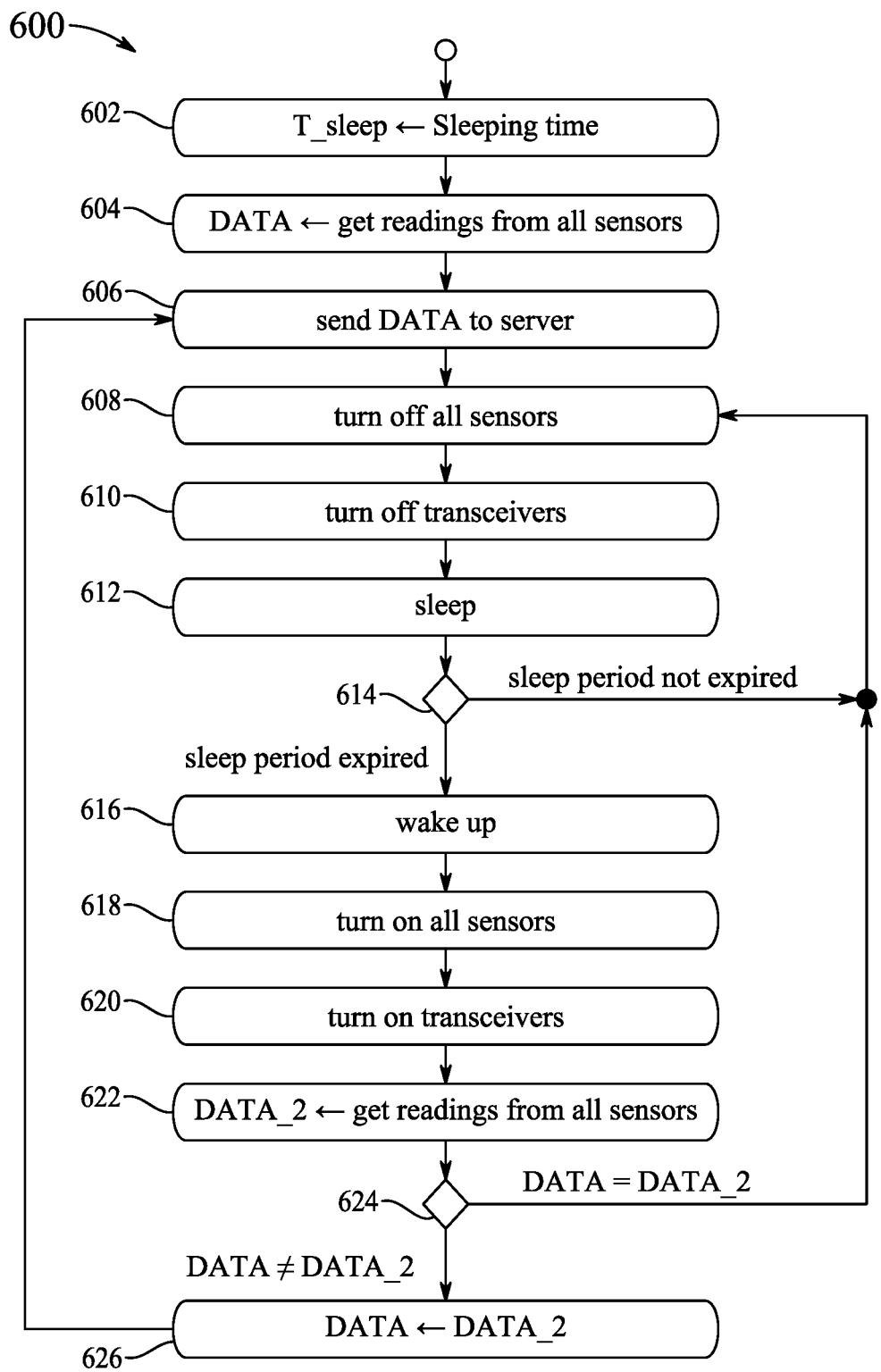
FIG. 6 is a state diagram for the internet of things nodes of the sensors in the waste bin, according to certain embodiments of the present disclosure.

FIG. 6 is a state diagram 600 for the internet of things (IoT) nodes of the sensors in the waste bin.

At least the methane sensor 216, the humidity sensor 212, the level sensor 218 and the temperature sensor 210 are (IoT) sensors which communicate directly with the cloud server. To preserve battery life, each of these IoT sensors are configured to go into sleep mode when not actively collecting or communicating data to the cloud server.

In step 602, Tsleep represents the time during which the IoT sensors are sleeping.

In step 604, each IoT sensor wakes up and collects DATA from its internal sensors.

In step 606, each IoT sensor transmits the DATA to the cloud server.

In step 608, each IoT sensor turns off its internal sensors.

In step 610, each IoT sensor turns off its transceiver.

In step 612, each IoT sensor goes back to sleep.

In step 614, if the sleep period has not expired for all sensors, the process returns to step 608 to turn off the sensors and the transceivers.

If the sleep period has expired, at step 616 each of the sensors again wake up, turn on at step 618, turn on their transceivers at step 620, and collect a second set of data (DATA_2) from their internal sensors at step 622.

At step 624, if DATA=DATA_2, the process returns to step 608 to turn off all sensors. If DATA≠DATA_2, in other words, if new data has been collected, then the new data (DATA_2) overwrites DATA. The process returns to step 606 to send the updated DATA to the cloud server.

Figure 7:
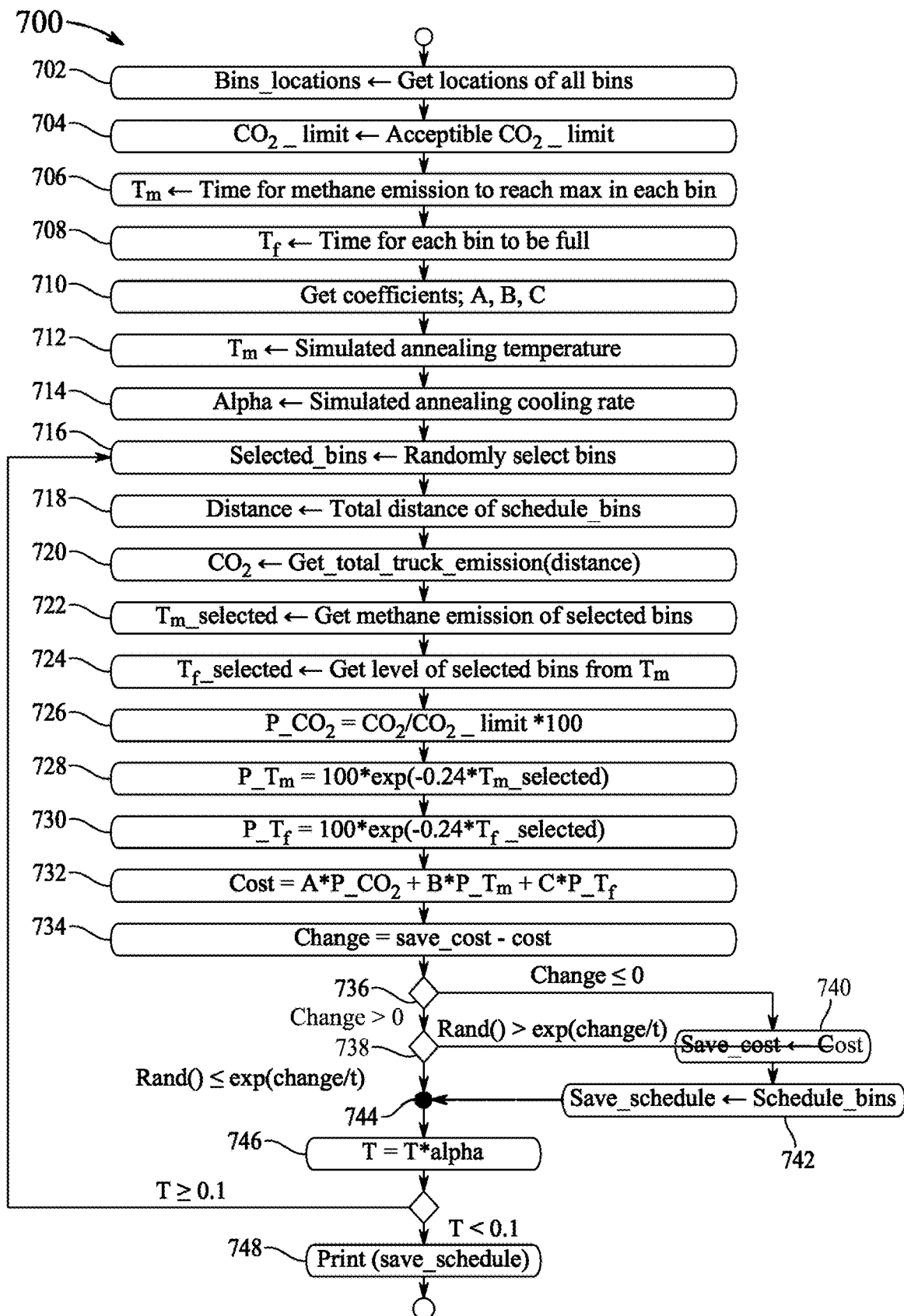
FIG. 7 is a state diagram for a simulated annealing calculation, according to certain embodiments of the present disclosure.

FIG. 7 is a state diagram 700 for the simulated annealing calculations.

At step 702, the bin location (Bins_locations) received by the cloud server are input to the ANN 308 and the metaheuristics processor 310. The location of the bins is received from the waste removal company or the DBMS.

At step 704, the $CO_2$ acceptable limit ($co_2$_limit) is received from the system administrator by the metaheuristics processor 310. The $co_2$_limit parameter is the amount of $CO_2$ emissions accepted as per government regulations or policies of the waste removal company.

At step 706, the time $T_m$ for methane emission to reach a maximum in each bin is calculated by the ANN 306 from the methane emissions received by the cloud server from each bin. The time until methane emissions from each bin exceeds acceptable limits ($T_m$) is collected from the ANN 306 by the metaheuristics processor 310.

At step 708, the metaheuristics processor 310 collects the time to full for the waste bins ($T_f$) from ANN 308. The time $T_f$ for each bin to be full is calculated by the ANN 308 from the level sensor data received by the cloud server from each bin.

At step 710, the coefficients A, B, C are parameters that indicate the importance (weights) of $co_2$_limit, $T_m$, and $T_f$, respectively. These parameters are received by the metaheuristics processor 310 from the system administrator. The sum of the three parameters must be unity (i.e., 1).

At step 712, the temperature parameter (T) is the temperature of the simulated annealing calculation. It determines the quality of solution initially accepted and how long the simulation will run.

At step 714, The parameter "alpha" is the cooling rate of the simulation. It also determines how long the simulation will run.

At step 716, a set of bins is randomly selected from the total bins given.

At step 718, a scheduled total distance is calculated for servicing the set of bins, schedule_bins.

At step 720, the total of the truck emissions of $CO_2$ over the scheduled route is calculated, get_total_truck_emission based on the distance travelled.

At step 722, the methane emissions of the set of bins, $T_m$_selected, is determined.

At step 724, the levels of waste, $T_f$_selected, in the set of bins is determined.

At step 726, the carbon dioxide emissions from step 720 are bounded between 0-100 percent.

At steps 728 and 730, $T_m$ and $T_f$ of the selected bins are bounded between 0-100 percent using the equation, $y=100e^{(-0.24t)}$. As shown in FIG. 5G, the equation converts the urgency of removing the bin as time reduces. At steps 728 and 730, the adjusted values for $T_m$ and $T_f$ are $p\_T_m$ and $p\_T_f$, respectively.

At step 732, a cost function is defined for the emissions of the selected bins. The cost is designed such that it tries to reduce $CO_2$ while increasing the number of bins collected and reducing the methane emission from the bins by collecting those bins with high methane emission. The remaining construct of the algorithm tries to reduce the cost. This mechanism is iterated until the value of the temperature T is less the 0.1. The cost function is given by:

$$\mathrm{Cost} = A * \mathrm{P\_CO}_2 + B * \mathrm{P\_T}_m + C * \mathrm{P\_T}_f.$$

At step 734, the error or difference between a previously saved cost and the cost calculated in step 732 is determined.

At Step 736, if the error (change) is greater than zero, the process proceeds to step 738. If the change is less than or equal to zero, the updated cost from step 732 is saved at step 740.

At step 742, the schedule to service the bins (schedule_bins) is saved (save_schedule) and sent to step 744.

At step 738, the high cost is accepted with a probability>exp(change/t); the probability is generated with the random number generator RAND( ) If this random number (or the probability) is greater than exp(change/t), the process moves to step 740 to save the cost and also moves to step 744 to save the schedule. Otherwise no changes are made to the cost and schedule and the algorithm moves to step 746.

At step 746, the temperature parameter (T) of the simulated annealing is multiplied by alpha, the cooling rate of the simulation to determine whether or not the annealing is complete, that is, is the scheduling of the waste removal route complete. If T<0.1, the schedule is printed (or otherwise output) at step 748. If T≥0.1, the process returns to step 716 to repeat.

Figure 8:
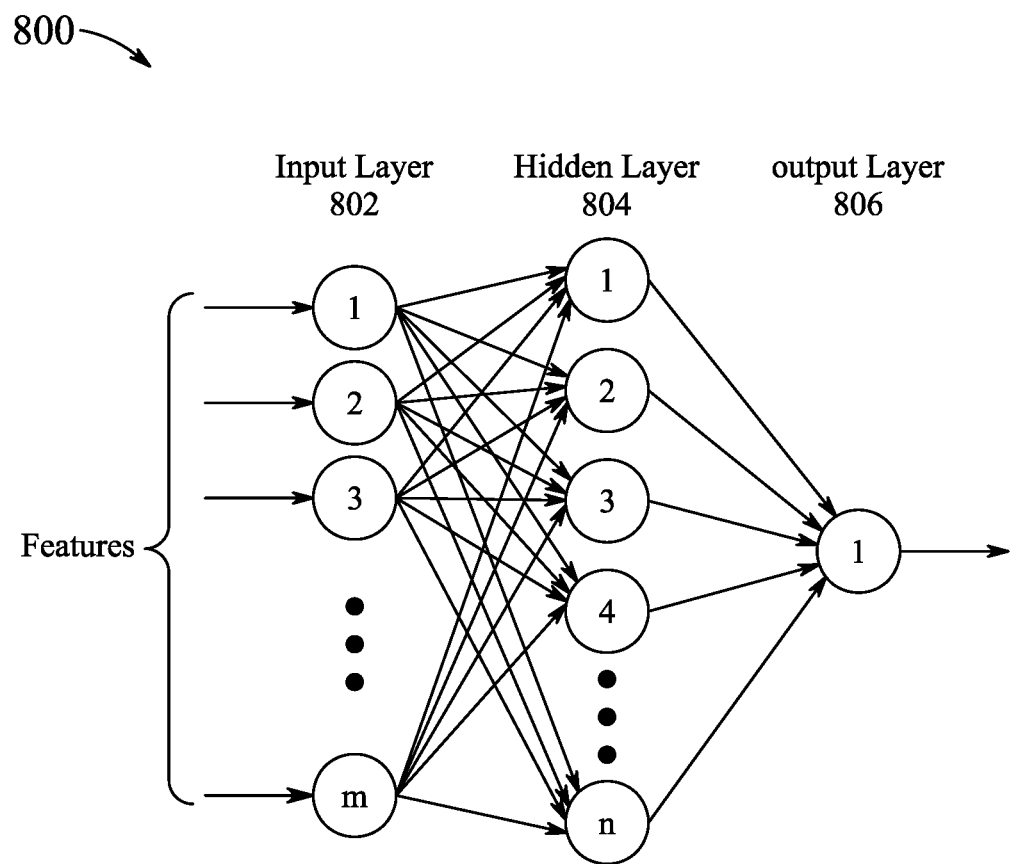
FIG. 8 represents the layers of the ANN 306 and the ANN 308, according to certain embodiments of the present disclosure.

FIG. 8 represents the layers of a representative ANN, such as the ANN 306 and the ANN 308. In FIG. 8, the features are applied to the input layer 802 of ANN, such as the parameters of FIG. 7. The hidden layer 804, represents the groupings determined of like features. The output layer 806 represents the best result determined from the groupings.

The present disclosure provides an eco-friendly waste management system 100 which reduces the waste vehicle emissions from the waste vehicles 108 used in the waste management system 100. Also, the waste management system 100 reduces methane emissions from the waste bins 102. Furthermore, the waste management system 100 ensures timely collection of the waste. The waste management system 100 keeps track of the activities of the waste vehicles 108 and the status of the waste bins 102. The waste management system 100 makes quality and statistical analysis of a company's waste collection activities easy and accurate. Also, the waste management system 100 uses wireless sensor networks (WSN) to notify the waste management company of the state of each waste bin under their area and advises him/her on when best to collect those bins. The waste management system 100 of the present disclosure monitors each bin to notify the management center to:

1) ensure collection of bins that will be full by the collection time to minimize the emission of methane;
2) that bins with greenhouse gas emissions are collected as early as possible; and
3) ensure that the waste removal trucks emit the minimum $CO_2$ and $CH_4$.

In summary, the system 100 of the present disclosure monitors the quantity of waste in each waste bin within its area. The system 100 uses AI to predict when each waste bin will be full. Then, the system 100 uses the aforementioned data to plan the waste collection path of the waste removal vehicles while ensuring minimal fuel consumption and emissions from the removal vehicles.

A first embodiment is illustrated with respect to FIG. 1 to FIG. 12. The first embodiment describes a waste management method. The method includes measuring, by a plurality of sensors located in each waste bin of a plurality of waste bins, a bin methane amount, a bin humidity, a bin waste level and a bin temperature; determining, by a location receiver located in each waste bin, a bin location of each waste bin; transmitting, by a sensor wireless communications transceiver of each of the plurality of sensors, the bin methane amount, the bin humidity, the bin waste level, the bin temperature and the bin location to a cloud server 106; receiving, by the cloud server, the bin methane amount, the bin waste level, the bin humidity, the bin temperature and the bin location from each of the plurality of sensors; recording, by the cloud server, a timestamp of the bin methane amount, the bin humidity, the bin waste level, the bin temperature and the bin location; transmitting, by the cloud server, the bin methane amount, the bin humidity and the bin temperature of each waste bin to a first processor 276; receiving, by the first processor, the bin methane amount, the bin humidity and the bin temperature of each waste bin and an allowable methane amount; transmitting, by the cloud server, the bin waste level and the bin location for each waste bin and the timestamp to a second processor 278; receiving, by the second processor, the bin waste level and the bin location of each waste bin, the timestamp and an allowable waste amount; generating, by the first processor, a first time estimate to reach the allowable methane amount based on the measured bin methane amounts and the temperature of the plurality of waste bins; transmitting, by the first processor, the first time estimate to a third processor (metaheuristics processor 280); generating, with the second processor, a second time estimate to reach the allowable waste amount based on the measured bin waste levels of the plurality of waste bins; transmitting, by the second processor, the second time estimate to the third processor; measuring, by a carbon dioxide sensor 253 located on each waste vehicle, an amount of carbon dioxide generated by each waste vehicle per unit time; determining, by a waste vehicle location receiver located on each waste vehicle, a location of the waste vehicle; determining, by a waste vehicle methane sensor 251 located on each waste vehicle, an amount of methane emissions of the waste within each waste vehicle; transmitting, by a wireless transceiver 252 of each waste vehicle, the amount of carbon dioxide, the location of the waste vehicle and the amount of methane emissions to the cloud server; transmitting, by the cloud server, the amount of carbon dioxide, the location of each waste vehicle and the amount of methane emissions of each waste vehicle to the third processor 280; receiving, by the third processor, the first time estimate, the second time estimate, the location of each waste bin, a set of parameters which determine the weighting of the first time estimate and the second time estimate, a number of waste vehicles available to empty the waste bins of waste, the amount of carbon dioxide generated by each waste vehicle per unit time, the location of each waste vehicle, and the amount of methane emissions of each waste vehicle; generating, with the third processor, a collection schedule and a waste vehicle route for each of the plurality of waste vehicles based on the first time estimate, the second time estimate, the location of each waste bin, the weighting of the first time estimate and the second time estimate, the number of waste vehicles available to empty the waste bins of waste, the amount of carbon dioxide generated by each waste vehicle per unit time, the location of each waste vehicle, and the amount of methane emissions of each waste vehicle; transmitting, by the cloud server, the collection schedule and the waste vehicle route to a database management system (DBMS) 282; transmitting, by the DBMS, the collection schedule and the waste vehicle route to each waste vehicle 108; receiving, by the wireless transceiver of each waste vehicle, the collection schedule and the waste vehicle route; removing, by the plurality of waste vehicles each travelling on the respective waste vehicle route, the waste from the plurality of waste bins, and emptying the waste in a waste collection facility according to the collection schedule.

The method includes determining, by the third processor, a total carbon dioxide emissions of the waste vehicles including a total amount of carbon dioxide emissions of each of the available waste vehicles in an urban location, a total amount of carbon dioxide emissions of each of the available waste vehicles on a highway location, and a total amount of carbon dioxide emissions of each of the available waste vehicles during transfer of the waste to a waste collection facility.

In an aspect, the first processor 276 includes an artificial neural network (ANN) for generating the first time estimate based on based on the measured bin methane amounts and the temperature of the plurality of waste bins.

In an aspect, the ANN of the first processor is selected from the group consisting of a multi-layer perceptron (MLP), a recursive neural network (RNN), and a recurrent neural network (RNN).

In an aspect, the second processor 278 includes an ANN for generating the second time estimate based on the measured bin waste levels in the plurality of waste bins.

In an aspect, the ANN of the second processor is selected from the group consisting of a multi-layer perceptron (MLP), a recursive neural network (RNN), and a recurrent neural network (RNN).

In an aspect, the third processor is a metaheuristics processor 280.

The method includes generating, by the metaheuristics processor, a schedule and a waste vehicle route for a waste vehicle further includes minimizing a cost function which includes weighted parameters of a time for the methane to reach an unacceptable level in each of the waste bins, the location of each waste bin, a time for each waste bin to fill completely, a number of waste vehicles that can be dispatched, and an emission model for the waste vehicles.

In an aspect, waste vehicle further comprises tracking, by a microcontroller 254 located on each waste vehicle, activities of the waste vehicle; and reporting, by the wireless transceiver 252 of the waste vehicle, the activities of the waste vehicle to the database management system (DBMS) 282, wherein the activities include the location of the waste vehicle, a distance of the waste vehicle from the waste collection facility, an on-time performance, an amount of the waste on the waste vehicle, and a posted highway speed.

The method further comprises monitoring, with a camera 260 located on the waste vehicle 108, a status of the waste collection; and transmitting, by the waste vehicle wireless transceiver, the status to the DBMS.

The method includes transmitting, by the waste vehicle wireless transceiver, the carbon dioxide level to the DBMS.

In an aspect, the total waste vehicle emissions of each waste vehicle while travelling in an urban setting ($C_{urban}$) is represented by the following formula:

$$C_{urban} = -611.662 + 1552.37\sqrt{x}$$

wherein $C_{urban}$ is measured in grams and x is a distance covered by the waste vehicle in kilometers.

In an aspect, the methane emissions of each waste vehicle while travelling on a highway ($C_{highway}$) is represented by the following formula:

$$C_{highway} = -55482 + 16942.9\sqrt{x}$$

wherein $C_{highway}$ is measured in grams and x is a distance covered by the waste vehicle in kilometers.

In an aspect, the total methane emissions of each waste vehicle while idling during trash collection ($C_{collection}$) is represented by the following formula:

$$C_{collection} = -350816 + 41757.3 \ln(t_{collect})$$

wherein $C_{collection}$ is measured in grams and $t_{collect}$ is a time it takes for waste collection in seconds.

In an aspect, the total methane emissions of each waste vehicle while idling during trash collection ($C_{landfill}$) is represented by the following formula:

$$C_{landfill} = -236622 + 30058 \ln(t_{dump})$$

wherein $C_{landfill}$ is measured in grams and $t_{dump}$ is a time it takes for emptying waste into a waste collection facility in seconds.

In an aspect, the $t_{dump}$ further includes an idling time while the waste vehicles wait to empty waste into the waste collection facility.

In an aspect, the method includes generating, by the metaheuristics processor, a schedule and a waste vehicle route for a waste vehicle employs a calculation using the following at least five inputs, and a time for methane to reach an unacceptable level in the waste bins, a location of the waste bins, a time for the waste bin to fill completely, a number of vehicles that can be dispatched, and an emission model for the waste vehicles.

In an aspect, the collection schedule for the waste vehicle includes a predicted start time of collection and a predicted end time of emptying the waste.

A second embodiment is illustrated with respect to FIG. 1 to FIG. 12. The second embodiment describes a system for waste management. The system includes a plurality of waste bins 102 configured to hold waste, wherein each waste bin includes a plurality of waste bin sensors including at least a waste bin methane sensor 216 configured to measure a bin methane amount, a waste bin level sensor 218 configured to determine a waste amount in the waste bin, a waste bin humidity sensor 212 configured to measure a waste bin humidity level inside the waste bin, a temperature sensor 210 configured to measure a waste bin temperature inside the waste bin, and a waste bin location receiver 214, wherein each of the plurality of sensors includes a sensor wireless communications transceiver.

The system further includes a plurality of waste vehicles 108, wherein each waste vehicle is configured to collect the waste from at least one of the plurality of waste bins based on a collection schedule and a waste vehicle route; a waste vehicle methane sensor 251 configured to measure a waste vehicle methane amount, a carbon dioxide sensor 253 configured to measure a carbon dioxide level of the waste in the waste vehicle, a camera 260 configured to record a status of the waste collection, a waste vehicle location receiver 214 and a waste vehicle wireless transceiver 252 located on each waste vehicle; a microcontroller 254 located on each waste vehicle, wherein the microcontroller is connected to the waste vehicle methane sensor, the carbon dioxide sensor, the camera, the waste vehicle location receiver and the waste vehicle wireless transceiver.

The system of the second embodiment includes a cloud server 104 configured to communicate bidirectionally with each waste vehicle wireless communications transceiver and each sensor wireless transceiver to receive and timestamp each bin methane amount, each bin waste amount, each waste bin humidity level, each temperature and the location of each bin, each waste vehicle methane amount, each carbon dioxide level of the waste in a waste vehicle, the status of each waste vehicle, and each waste vehicle location and transmit each bin methane amount, each bin waste amount, each waste bin humidity level, each temperature and the location of each bin, each waste vehicle methane amount, each carbon dioxide level of the waste in a waste vehicle, the status of each waste vehicle, each waste vehicle location and their respective timestamps to a database management system (DMBS) 282; a cloud server memory configured to store an allowable bin methane amount, an allowable bin waste amount for each waste bin; a first processor 276, a second processor 278 and a metaheuristics processor 280 located within the cloud server, wherein the metaheuristics processor is connected to the first processor, the second processor and the DBMS; wherein the first processor is configured to receive the allowable bin methane amount, the allowable bin waste amount for each waste bin, each bin methane amount, each waste bin humidity level and each waste bin temperature, and generate a first time estimate to reach the allowable methane amount based on the measured bin methane amounts, waste bin humidity level and waste bin temperature of each of the plurality of waste bins; wherein the second processor is configured to receive the bin waste amount, the waste bin location, the timestamp and an allowable waste level of each waste bin and generate a second time estimate to reach the allowable waste amount based on the measured bin waste amounts of plurality of waste bins; wherein the metaheuristics processor is configured to receive the first time estimate, the second time estimate, the location of each waste bin, a set of parameters which determine the weighting of the first time estimate and the second time estimate, a number of waste vehicles available to empty the waste bins of waste, the amount of carbon dioxide generated by each waste vehicle per unit time, the location of each waste vehicle, and the amount of methane emissions of each waste vehicle and generate a collection schedule and a waste vehicle route for each of the plurality of waste vehicles based on the first time estimate, the second time estimate, the location of each waste bin, the weighting of the first time estimate and the second time estimate, the number of waste vehicles available to empty the waste bins of waste, the amount of carbon dioxide generated by each waste vehicle per unit time, the location of each waste vehicle, and the amount of methane emissions of each waste vehicle; wherein the metaheuristics processor is further configured to determine a total methane emission including a total amount of methane emissions of each of the available waste vehicles in an urban location, a total amount of emissions of each of the available waste vehicles on a highway location, and a total amount of emissions of each of the available waste vehicles during transfer of the waste to a waste collection facility and transmit the collection schedule and the waste vehicle route to the DBMS, wherein the DBMS is configured to transmit the collection schedule and waste vehicle route to each waste vehicle; and the waste vehicles are configured to remove the waste from the plurality of waste bins, travel on the waste vehicle route and empty the waste in a waste collection facility according to the collection schedule.

In an aspect, the first processor is configured with an artificial neural network (ANN), wherein the ANN of the first processor is configured to generate the first time estimate based on the measured bin methane amounts, the waste bin humidity level and the waste bin temperature of each of the plurality of waste bins; and the second processor is configured with an artificial neural network (ANN), wherein the ANN of the second processor is configured to generate the second time estimate based on the measured waste amounts in the plurality of waste bins.

In an aspect, the microcontroller of each waste vehicle is configured to track activities of each of the waste vehicle and report, by the waste vehicle wireless transceiver, the activities to the DBMS; wherein the activities include a location of the waste vehicle, a distance of the waste vehicle from a waste collection facility, an on-time performance, an amount of the waste on the waste vehicle, and a posted highway speed.

Next, further details of the hardware description of the computing environment of FIG. 1 according to exemplary embodiments is described with reference to FIG. 9.

Figure 9:
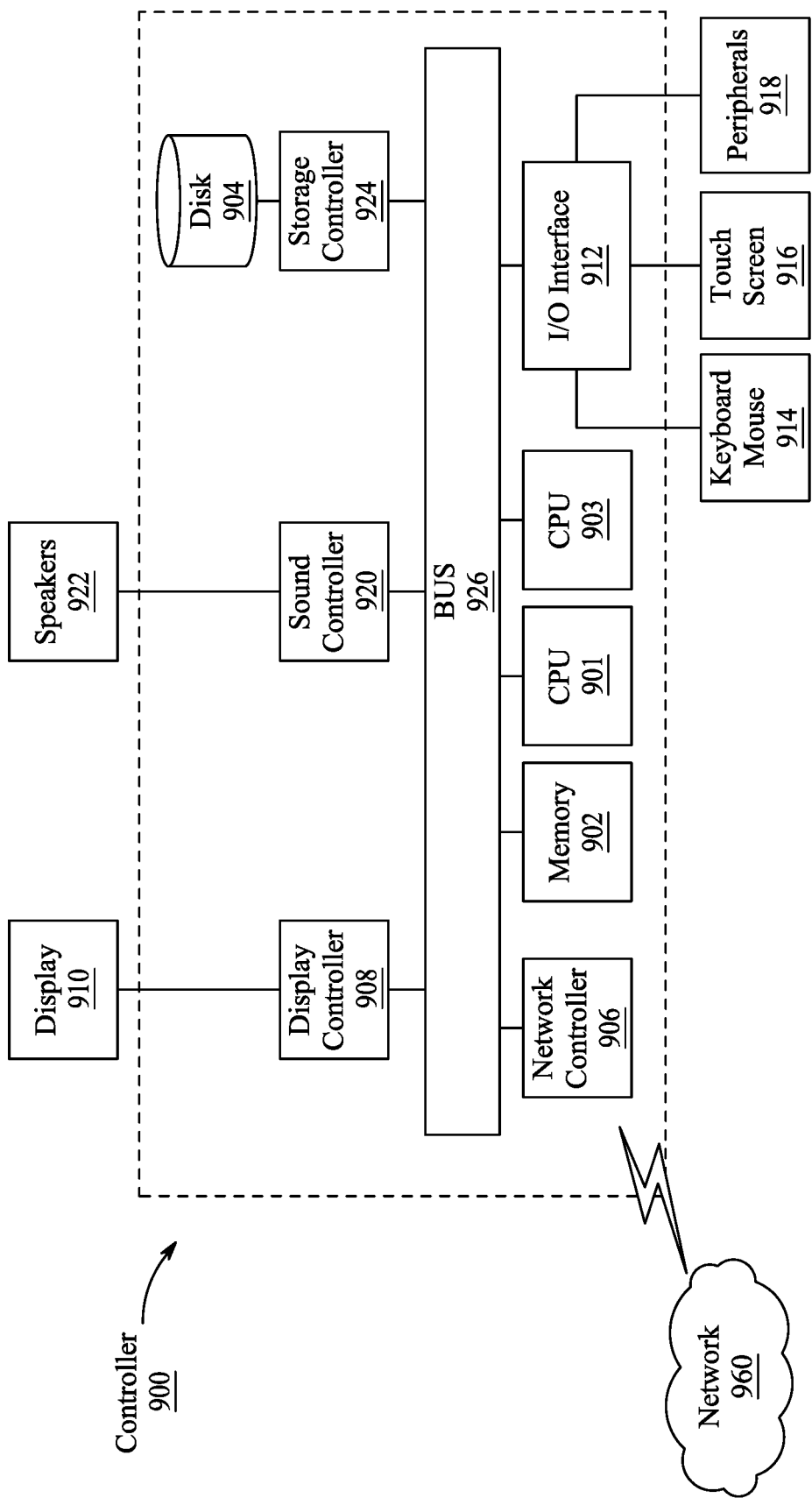
FIG. 9 is an illustration of a non-limiting example of details of computing hardware used in the computing system of the system for waste management, according to certain embodiments of the present disclosure.

In FIG. 9, a controller 900 is described as representative of the waste management system 100 of FIG. 1. FIG. 9 is an illustration of non-limiting example of details of computing hardware used in the waste management system 100 of FIG. 1, according to exemplary aspects of the present disclosure. In FIG. 9, the controller 900 is a computing device (that includes the cloud server 104) and includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of the ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
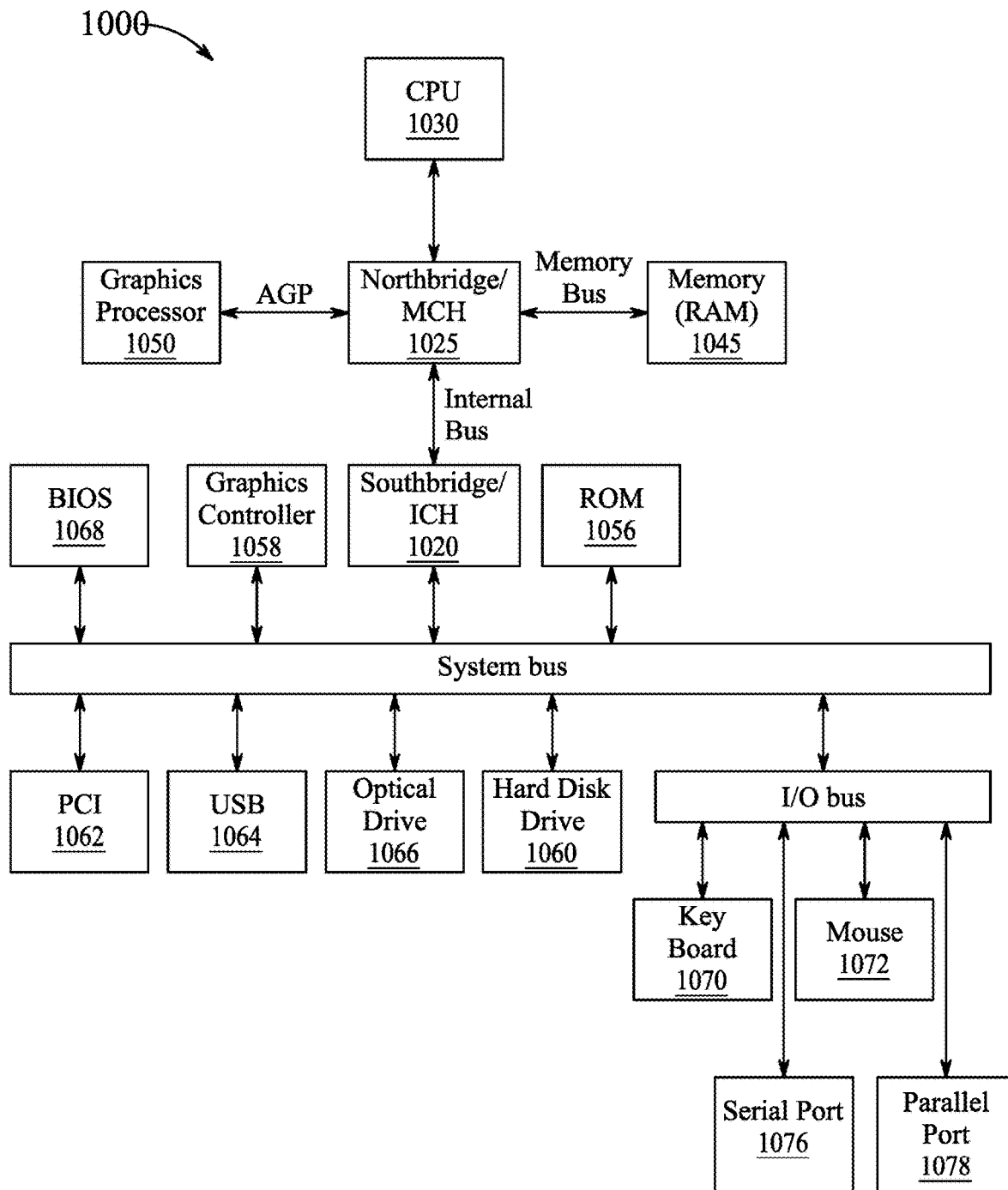
FIG. 10 is an exemplary schematic diagram of a data processing system used within the computing system, according to certain embodiments of the present disclosure.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1080 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
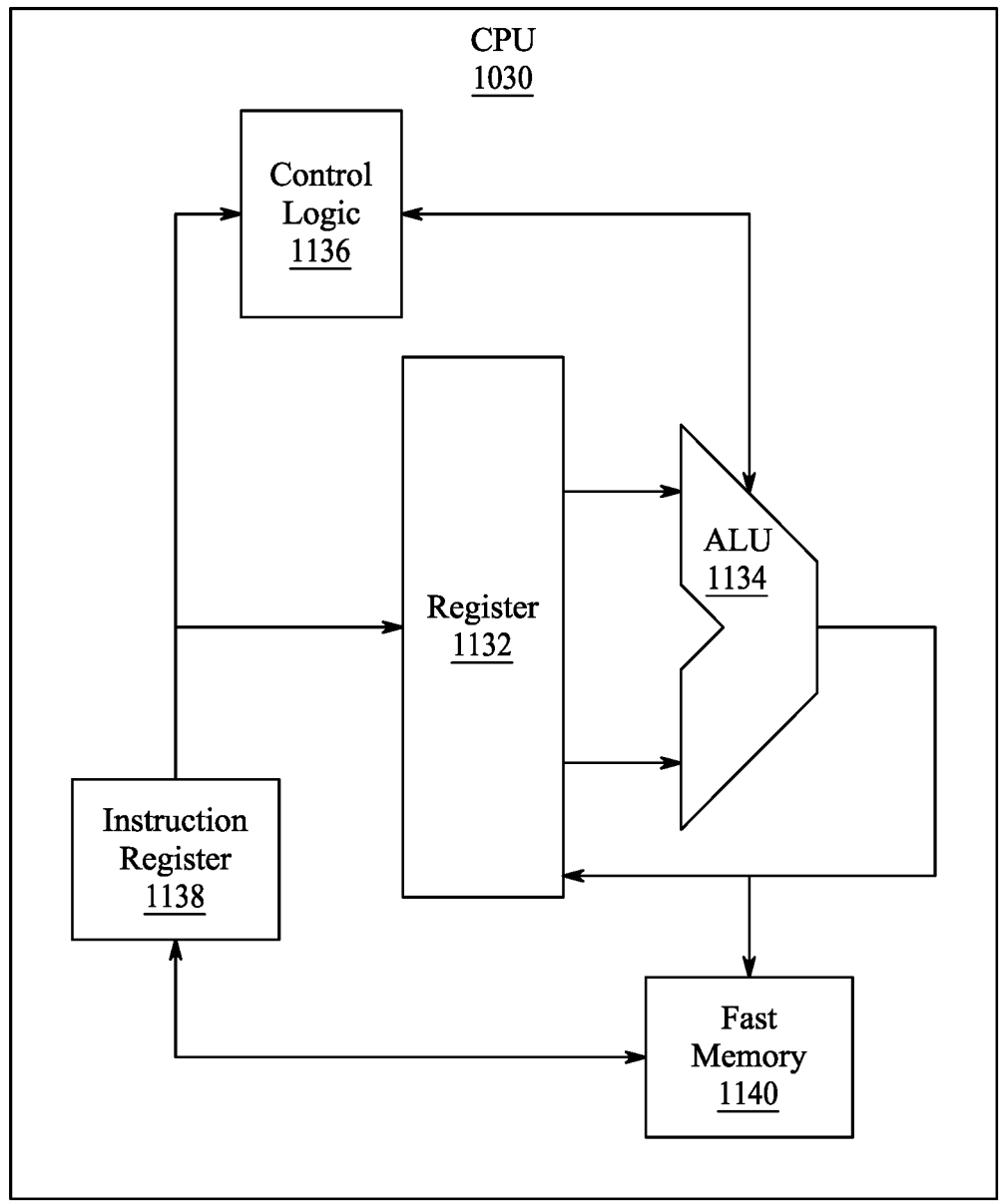
FIG. 11 is an exemplary schematic diagram of a processor used with the computing system, according to certain embodiments of the present disclosure.

For example, FIG. 11 shows one aspect of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1130. Part of the instructions can also be directed to the register 1132. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1080 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and CD-ROM 1056 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1060 and optical drive 1066 can also be coupled to the SB/ICH 1020 through a system bus. In one aspects of the present disclosure, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
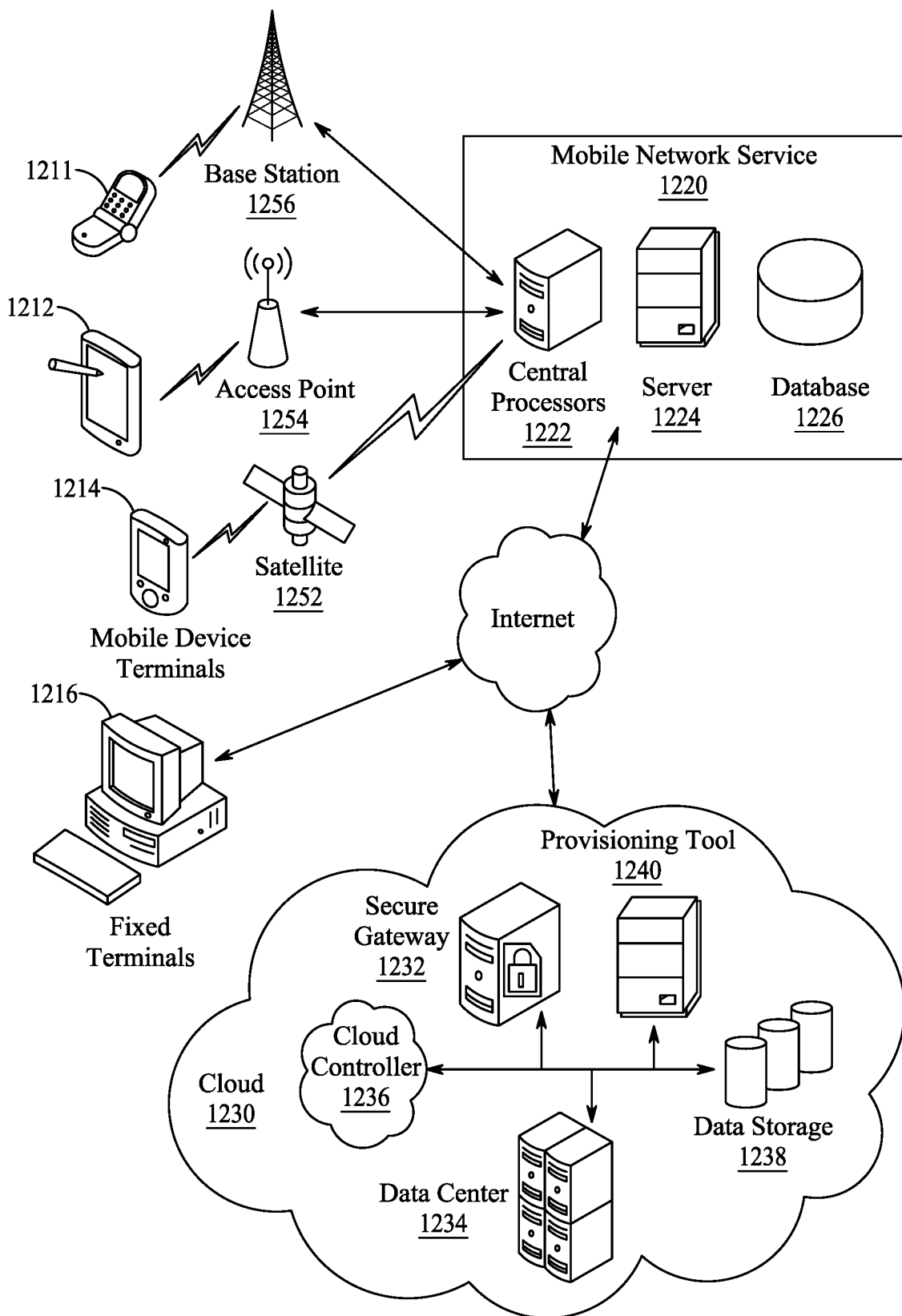
FIG. 12 is an illustration of a non-limiting example of distributed components which may share processing with the controller, according to certain embodiments of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). More specifically, FIG. 12 illustrates client devices including smart phone 1211, tablet 1212, mobile device terminal 1214 and fixed terminals 1216. These client devices may be commutatively coupled with a mobile network service 1220 via base station 1256, access point 1254, satellite 1252 or via an internet connection. Mobile network service 1220 may comprise central processors 1222, server 1224 and database 1226. Fixed terminals 1216 and mobile network service 1220 may be commutatively coupled via an internet connection to functions in cloud 1230 that may comprise security gateway 1232, data center 1234, cloud controller 1236, data storage 1238 and provisioning tool 1240. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein. Numerous modifications and variations of the present disclosure are possible in light of the above teachings. It is therefore to be understood that within the scope of the appended claims, the invention may be practiced otherwise than as specifically described herein.

The invention claimed is:
1. A waste management method to monitor and control emission of $CO_2$ and $CH_4$ from a waste collection system comprising a plurality of waste bins each waste bin having a waste bin housing and a lid on top of the waste bin housing, a plurality of sensors, a plurality of waste vehicles and a waste collection facility, wherein each waste bin of the plurality of waste bins has at least one sensor of the plurality of sensors, wherein the sensors and the waste vehicles are in wireless communication with a cloud server, comprising:
   measuring, by the plurality of sensors located in each waste bin of the plurality of waste bins, a bin methane amount, a bin humidity, a bin waste level and a bin temperature with a methane sensor, a humidity sensor, a waste level sensor and a temperature sensor, respectively, each located under the lid of the waste bin;
   determining, by a location receiver located in each waste bin, a bin location of each waste bin;
   transmitting, by a sensor wireless communications transceiver of each of the plurality of sensors, the bin methane amount, the bin humidity, the bin waste level, the bin temperature and the bin location to the cloud server;
   receiving, by the cloud server, the bin methane amount, the bin waste level, the bin humidity, the bin temperature and the bin location from each of the plurality of sensors;
   recording, by the cloud server, a timestamp of the bin methane amount, the bin humidity, the bin waste level, the bin temperature and the bin location;
   transmitting, by the cloud server, the bin methane amount, the bin humidity and the bin temperature of each waste bin to a first processor;
   receiving, by the first processor, the bin methane amount, the bin humidity and the bin temperature of each waste bin and an allowable methane amount;
   transmitting, by the cloud server, the bin waste level and the bin location for each waste bin and the timestamp to a second processor;
   receiving, by the second processor, the bin waste level and the bin location of each waste bin, the timestamp and an allowable waste amount;
   generating, by the first processor, a first time estimate to reach the allowable methane amount based on the measured bin methane amounts and the temperature of the plurality of waste bins;
   transmitting, by the first processor, the first time estimate to a third processor;
   generating, with the second processor, a second time estimate to reach the allowable waste amount based on the measured bin waste levels of the plurality of waste bins;
   transmitting, by the second processor, the second time estimate to the third processor;
   measuring, by a carbon dioxide sensor located on each waste vehicle of the plurality of waste vehicles, an amount of carbon dioxide generated by each waste vehicle per unit time;
   determining, by a waste vehicle location sensor located on each waste vehicle, a location of the waste vehicle;
   determining, by a waste vehicle methane sensor located on each waste vehicle, an amount of methane emissions of the waste within each waste vehicle;
   transmitting, by a wireless transceiver of each waste vehicle, the amount of carbon dioxide, the location of the waste vehicle and the amount of methane emissions to the cloud server;
   transmitting, by the cloud server, the amount of carbon dioxide, the location of each waste vehicle and the amount of methane emissions of each waste vehicle to the third processor;
   receiving, by the third processor, the first time estimate, the second time estimate, the location of each waste bin, a set of parameters which determine the weighting of the first time estimate and the second time estimate, a number of waste vehicles available to empty the waste bins of waste, the amount of carbon dioxide generated by each waste vehicle per unit time, the location of each waste vehicle, and the amount of methane emissions of each waste vehicle;
   generating, with the third processor, a collection schedule and a waste vehicle route for each of the plurality of waste vehicles based on the first time estimate, the second time estimate, the location of each waste bin, the weighting of the first time estimate and the second time estimate, the number of waste vehicles available to empty the waste bins of waste, the amount of carbon dioxide generated by each waste vehicle per unit time, the location of each waste vehicle, and the amount of methane emissions of each waste vehicle;
   transmitting, by the cloud server, the collection schedule and the waste vehicle route to a database management system (DBMS);
   transmitting, by the DBMS, the collection schedule and the waste vehicle route to each waste vehicle;
   receiving, by the wireless transceiver of each waste vehicle, the collection schedule and the waste vehicle route;
   transferring, based on the collection schedule, the waste from the plurality of waste bins into the plurality of waste vehicles, wherein each waste vehicle is travelling on the respective waste vehicle route, and
   emptying the waste from each waste vehicle into the waste collection facility according to the collection schedule.

2. The waste management method of claim 1, further comprising:
   determining, by the third processor, a total carbon dioxide emissions of the waste vehicles including a total amount of carbon dioxide emissions of each of the available waste vehicles in an urban location, a total amount of carbon dioxide emissions of each of the available waste vehicles on a highway location, and a total amount of carbon dioxide emissions of each of the available waste vehicles during transfer of the waste to a waste collection facility.

3. The method of claim 1, wherein the first processor includes an artificial neural network (ANN) for generating the first time estimate based on based on the measured bin methane amounts and the temperature of the plurality of waste bins.

4. The method of claim 3, wherein the ANN of the first processor is selected from the group consisting of a multi-layer perceptron (MLP), a recursive neural network (RNN), and a recurrent neural network (RNN).

5. The method of claim 1, wherein the second processor includes an artificial neural network (ANN) for generating the second time estimate based on the measured bin waste levels in the plurality of waste bins.

6. The method of claim 5, wherein the ANN of the second processor is selected from the group consisting of a multi-layer perceptron (MLP), a recursive neural network (RNN), and a recurrent neural network (RNN).

7. The method of claim 1, wherein the third processor is a metaheuristics processor.

8. The method of claim 7, wherein generating, by the metaheuristics processor, a schedule and a waste vehicle route for a waste vehicle further includes:
minimizing a cost function which includes weighted parameters of a time for the methane to reach an unacceptable level in each of the waste bins, the location of each waste bin, a time for each waste bin to fill completely, a number of waste vehicles that can be dispatched, and an emission model for the waste vehicles.

9. The method of claim 1, further comprising:
tracking, by the microcontroller located on each waste vehicle, activities of the waste vehicle; and
reporting, by the wireless transceiver of each waste vehicle, the activities of the waste vehicle to the database management system (DBMS), wherein the activities include the location of the waste vehicle, a distance of the waste vehicle from the waste collection facility, an on-time performance, an amount of the waste on the waste vehicle, and a posted highway speed.

10. The method of claim 9, further comprising:
monitoring, with a camera located on the waste vehicle, a status of the waste collection; and
transmitting, by the waste vehicle wireless transceiver, the status to the DBMS.

11. The method of claim 9, further comprising:
transmitting, by the waste vehicle wireless transceiver, the carbon dioxide level to the DBMS.

12. The method of claim 1, wherein the total waste vehicle emissions of each waste vehicle while travelling in an urban setting ($C_{urban}$) is represented by the following formula:

$$C_{urban} = -611.662 + 1552.37\sqrt{x}$$

wherein $C_{urban}$ is measured in grams and x is a distance covered by the waste vehicle in kilometers.

13. The method of claim 1, wherein the methane emissions of each waste vehicle while travelling on a highway ($C_{highway}$) is represented by the following formula:

$$C_{highway} = -55482 + 16942.9\sqrt{x}$$

wherein $C_{highway}$ is measured in grams and x is a distance covered by the waste vehicle in kilometers.

14. The method of claim 1, wherein the total methane emissions of each waste vehicle while idling during waste collection ($C_{collection}$) is represented by the following formula:

$$C_{collection} = -350816 + 41757.3 \ln(t_{collect})$$

wherein $C_{collection}$ is measured in grams and $t_{collect}$ is a time it takes for collection of all the waste in the waste bins in seconds.

15. The method of claim 1, wherein the total methane emissions of each waste vehicle while idling during waste emptying ($C_{landfill}$) is represented by the following formula:

$$C_{landfill} = -236622 + 30058 \ln(t_{dump})$$

wherein $C_{landfill}$ is measured in grams and $t_{dump}$ is a time it takes for emptying waste into a waste collection facility in seconds.

16. The method of claim 15, wherein $t_{dump}$ further includes an idling time while the waste vehicles wait to empty waste into the waste collection facility.

17. The method of claim 1, wherein the collection schedule for the waste vehicle includes a predicted start time of waste collection and a predicted end time of emptying the waste.

* * * * *